United States Patent
Akiyama et al.

(10) Patent No.: US 11,791,906 B2
(45) Date of Patent: Oct. 17, 2023

(54) OPTICAL DEMULTIPLEXING DEVICE AND TRANSMISSION DEVICE

(71) Applicant: FUJITSU LIMITED, Kawasaki (JP)

(72) Inventors: Tomoyuki Akiyama, Yokohama (JP); Takeshi Hoshida, Kawasaki (JP); Shinsuke Tanaka, Hiratsuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/835,504

(22) Filed: Jun. 8, 2022

(65) Prior Publication Data

US 2023/0064847 A1 Mar. 2, 2023

(30) Foreign Application Priority Data

Aug. 25, 2021 (JP) .................................. 2021-137147
Jan. 12, 2022 (JP) .................................. 2022-002821

(51) Int. Cl.
*H04B 10/61* (2013.01)
*G02B 6/12* (2006.01)

(52) U.S. Cl.
CPC ..... *H04B 10/6166* (2013.01); *G02B 6/12007* (2013.01); *H04B 10/6162* (2013.01)

(58) Field of Classification Search
None
See application file for complete search history.

(56) References Cited

U.S. PATENT DOCUMENTS

| | | | | |
|---|---|---|---|---|
| 5,734,486 A * | 3/1998 | Guillemot | .......... | H04Q 11/0005 398/53 |
| 6,754,411 B2 * | 6/2004 | Ahmadvand | ........ | G02B 6/2938 385/24 |
| 6,925,257 B2 * | 8/2005 | Yoo | .......... | H04L 45/50 398/47 |
| 7,200,299 B1 * | 4/2007 | Earnshaw | .......... | G02B 6/29355 385/24 |
| 7,995,923 B2 * | 8/2011 | Sakharov | ................ | H04J 14/02 398/43 |
| 10,491,321 B2 * | 11/2019 | Akiyama | .............. | G02B 6/2935 |
| 11,119,278 B2 * | 9/2021 | Akiyama | ........... | G02B 6/29395 |
| 2019/0245642 A1 * | 8/2019 | Akiyama | ........... | G02B 6/29355 |
| 2022/0416886 A1 * | 12/2022 | Akiyama | .......... | H04B 10/07955 |

FOREIGN PATENT DOCUMENTS

| | | |
|---|---|---|
| JP | 5-160808 | 6/1993 |
| JP | 2019-135524 | 8/2019 |

* cited by examiner

*Primary Examiner* — Jai M Lee
(74) *Attorney, Agent, or Firm* — STAAS & HALSEY LLP

(57) ABSTRACT

An optical demultiplexing device includes a light source, a demultiplexer, a plurality of converters, a detector, a switch, and a controller, wherein the demultiplexer includes a plurality of asymmetric Mach-Zehnder interferometers (AMZ) each of which lengths of a pair of arms are different from each other, the plurality of AMZs are coupled to each other so that a plurality of wavelength lights input from the light source is demultiplexed and respectively output to the converters different from each other, and the controller controls the light source so that the plurality of wavelength lights is sequentially input to the demultiplexer one by one, and controls the switch so that an electrical signal detected by the detector is output to an output destination according to a wavelength light of a conversion source of the electrical signal.

13 Claims, 31 Drawing Sheets

FIG. 8

|  | OPTICAL DEMULTIPLEXER | CROSS CONNECT SWITCH | |
|---|---|---|---|
| CENTER WAVELENGTH | OUTPUT PORT ID | INPUT PORT ID | OUTPUT PORT ID |
| $\lambda a$ | P#4 | P22 | P33 |
| $\lambda b$ | P#2 | P12 | P34 |
| $\lambda c$ | P#3 | P21 | P43 |
| $\lambda d$ | P#1 | P11 | P44 |

FIG. 18

|  | OPTICAL DEMULTIPLEXER | CROSS CONNECT SWITCH | |
|---|---|---|---|
| WAVELENGTH | OUTPUT PORT ID | OUTPUT PORT ID | INPUT PORT ID |
| $\lambda a$ | P#4 | P44 | P11 |
| $\lambda b$ | P#2 | P34 | P12 |
| $\lambda c$ | P#3 | P43 | P21 |
| $\lambda d$ | P#1 | P33 | P22 |

FIG. 29

| CENTER WAVELENGTH | OPTICAL DEMULTIPLEXER | WAVELENGTH VARIABLE LIGHT SOURCE | | CROSS CONNECT SWITCH | |
|---|---|---|---|---|---|
| | OUTPUT PORT ID | INITIAL | AFTER SWITCHING | INPUT PORT ID | OUTPUT PORT ID |
| λa | P#4 | CHANNEL #1 | CHANNEL #4 | P22 | P33 |
| λb | P#2 | CHANNEL #2 | CHANNEL #2 | P12 | P34 |
| λc | P#3 | CHANNEL #3 | CHANNEL #3 | P21 | P43 |
| λd | P#1 | CHANNEL #4 | CHANNEL #1 | P11 | P44 |

OPTICAL DEMULTIPLEXING DEVICE AND TRANSMISSION DEVICE

CROSS-REFERENCE TO RELATED APPLICATION

This application is based upon and claims the benefit of priority of the prior Japanese Patent Application Nos. 2022-2821, filed on Jan. 12, 2022, and 2021-137147, filed on Aug. 25, 2021, the entire contents of which are incorporated herein by reference.

FIELD

The embodiments discussed herein are related to an optical demultiplexing device and a transmission device.

BACKGROUND

For example, an optical demultiplexer is disclosed in which asymmetric Mach-Zehnder interferometers (AMZ) of which lengths of a pair of arms are different from each other are multi-stage connected in a tree-like shape as an optical integrated circuit. This type of optical demultiplexer is, for example, used as a unit for demultiplexing a signal light for each wavelength from a wavelength multiplexing signal light input from a transmission path and a unit for demultiplexing a transmission light for each wavelength to be optically modulated from a multi-wavelength light in a wavelength multiplexing optical transmission device.

Japanese Laid-open Patent Publication No. 2019-135524 is disclosed as related art.

SUMMARY

According to an aspect of the embodiments, an optical demultiplexing device includes a light source configured to output a plurality of wavelength lights of which a wavelength spacing is constant, a demultiplexer configured to demultiplex the plurality of wavelength lights, a plurality of converters configured to respectively convert the plurality of wavelength lights into a plurality of electrical signals, a detector configured to detect the plurality of electrical signals respectively output from the plurality of converters, a first switch configured to select an output destination of each of the plurality of electrical signals from among a plurality of output destinations, and a controller configured to control the light source and the first switch, wherein the demultiplexer includes a plurality of asymmetric Mach-Zehnder interferometers each of which lengths of a pair of arms are different from each other, the plurality of asymmetric Mach-Zehnder interferometers are coupled to each other so that the plurality of wavelength lights input from the light source is demultiplexed and respectively output to the converters different from each other, of the plurality of converters, and the controller controls the light source so that the plurality of wavelength lights is sequentially input to the demultiplexer one by one, and controls the first switch so that the electrical signal detected by the detector, among the plurality of electrical signals, is output to an output destination of the plurality of output destinations according to a wavelength light of the plurality of wavelength lights of a conversion source of the electrical signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a setting table in a memory;

FIG. 18 is a diagram illustrating an example of a setting table in a memory;

FIG. 29 is a diagram illustrating an example of a setting table in a memory;

DESCRIPTION OF EMBODIMENTS

A signal light or a transmission light (hereinafter, referred to as wavelength light) for each wavelength branched by an optical demultiplexer in which AMZs of which lengths of a pair of arms are different from each other are multi-stage connected in a tree-like shape as an optical integrated circuit is output from the last AMZ. However, an output port of the wavelength light is randomly determined according to an initial optical phase in the pair of arms of each AMZ. Therefore, it is not possible to output each wavelength light to an arbitrary output destination, and it is difficult to execute appropriate signal processing for each wavelength of each wavelength light. Note that this problem exists not only in an optical demultiplexer disclosed in Japanese Laid-open Patent Publication No. 2019-135524 A but also in other optical demultiplexers using an AMZ of which an output port of light is randomly determined.

[Configuration of Optical Demultiplexer]

Figure 1:
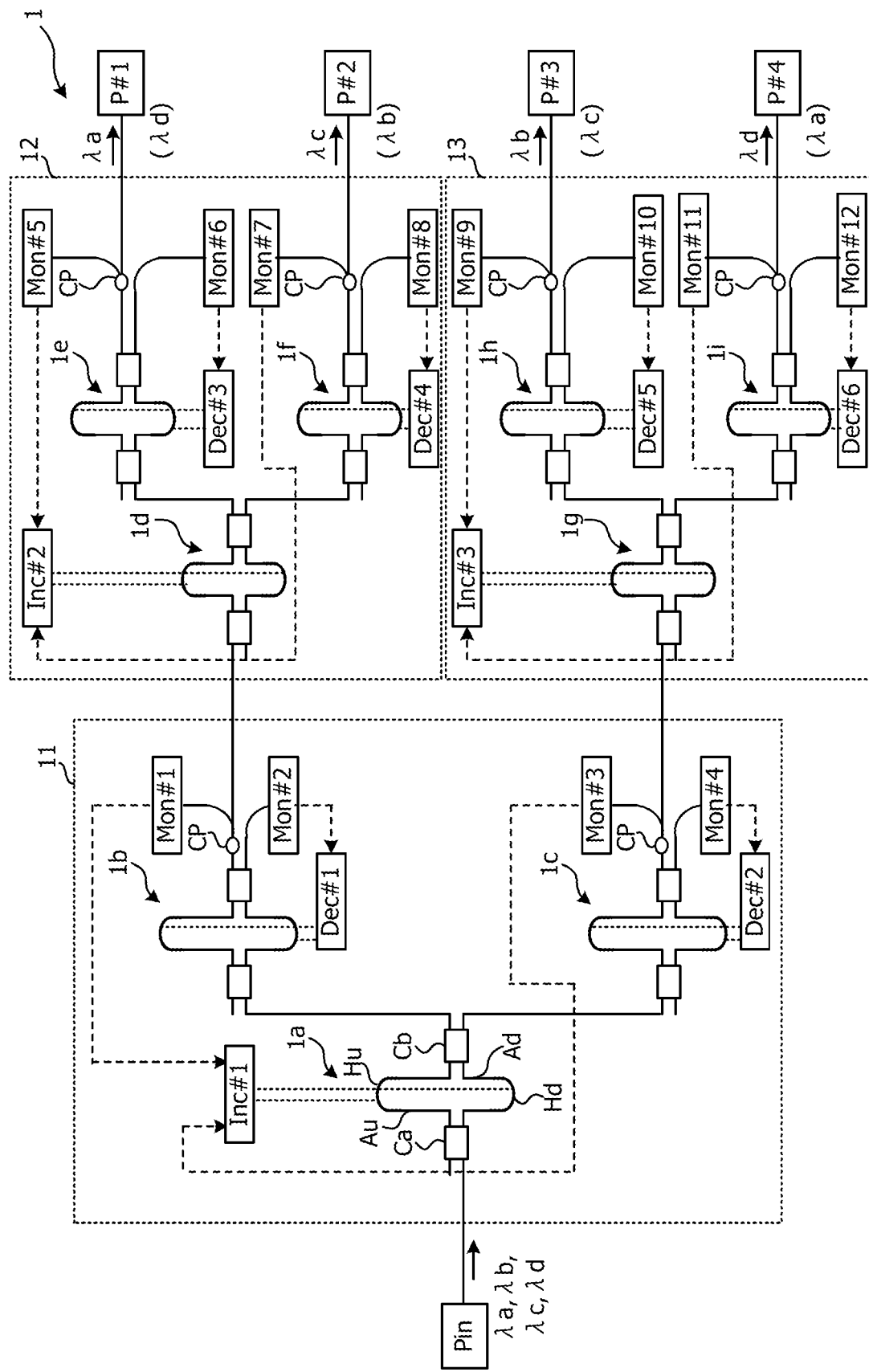
FIG. 1 is a configuration diagram illustrating an example of an optical demultiplexer.

FIG. 1 is a configuration diagram illustrating an example of an optical demultiplexer 1. The optical demultiplexer 1 includes a pre-stage demultiplexing circuit 11 and post-stage demultiplexing circuits 12 and 13 that are optically connected to the post stage of the pre-stage demultiplexing circuit 11. The optical demultiplexer 1 demultiplexes wavelength lights with center wavelengths λa to λd with constant wavelength spacings from a four-wavelength wavelength multiplexing signal lights as an example. The optical demultiplexer 1 executes demultiplexing processing in units of each of the pre-stage demultiplexing circuit 11 and the post-stage demultiplexing circuits 12 and 13. Note that the optical demultiplexer 1 is an example of a first and second demultiplexing units.

The optical demultiplexer 1 includes an asymmetric Mach-Zehnder interferometer (hereinafter, referred to as AMZ) 1a to 1i connected in multiple stages in a tree-like shape. The pre-stage demultiplexing circuit 11 includes the AMZs 1a to 1c, the post-stage demultiplexing circuit 12 includes the AMZs 1d to 1f, and the post-stage demultiplexing circuit 13 includes the AMZs 1g to 1i.

Each of the AMZs 1a to 1i includes a pair of arms Au and Δd having different lengths (waveguide length), an input coupler Ca, and an output coupler Cb. Each of the input coupler Ca and the output coupler Cb is a 2×2 coupler including two input ports and two output ports.

The two output ports of the input coupler Ca are optically respectively connected to input ends of the pair of arms Au and Δd, and the two input ports of the output coupler Cb are optically respectively connected to output ends of the pair of arms Au and Δd. Signal lights Sa to Sd (not illustrated in FIGS. 1 and 2) input to the input coupler Ca are input to the pair of arms Au and Δd.

A phase shifter Hu is provided in the upper arm Au, and a phase shifter Hd is provided in the lower arm Δd. The phase shifters Hu and Hd respectively adjust optical phases of the pair of arms Au and Δd of each of the AMZs 1a to 1i. As a result, a difference between the optical phases caused by variations at the time of manufacturing or the like is compensated.

The phase shifters Hu and Hd are heaters formed of a metal (resistor) thin film including, for example, tungsten, titanium, platinum, or the like and change temperatures of waveguides in the arms Au and Δd. Because this changes refractive indexes in the arms Au and Δd, the optical phases in the arms Au and Δd are adjusted. Note that the configurations of the phase shifters Hu and Hd are not limited to this and may be a unit that electrically changes a carrier density in the waveguide of each of the arms Au and Δd by a carrier plasma effect.

Furthermore, in order to control each of the phase shifters Hu and Hd of the AMZs 1a to 1i, the optical demultiplexer 1 includes monitor circuits Mon #1 to Mon #12 that monitor power of output light of the AMZs 1a to 1i, compensation circuits Dec #1 to Dec #6 that decrease the power according to a monitoring result the power of the output light, and compensation circuits Inc #1 to Inc #3 that increase the power according to the result of monitoring the power of the output light. The monitor circuits Mon #1 to Mon #12 are implemented by, for example, photodiodes, and the compensation circuits Dec #1 to Dec #3 and Inc #1 to Inc #3 are implemented by, for example, field programmable gate arrays (FPGA), application specified integrated circuits (ASIC), or the like.

The monitor circuits Mon #1 to Mon #12 respectively monitor the power of the output light of the AMZs 1b, 1c, 1e, 1f, 1h, and 1i. The compensation circuits Dec #1 to Dec #6 and Inc #1 to Inc #3 compensate the difference between the optical phases by controlling an adjustment amount of the optical phases in the pair of arms Au and Δd for the phase shifters Hu and Hd according to the power of the output light. For example, the compensation circuits Dec #1 to Dec #6 and Inc #1 to Inc #3 control heater power supplied to the phase shifters Hu and Hd.

In the pre-stage demultiplexing circuit 11, the AMZs 1a to 1c, the compensation circuits Inc #1 and Dec #2 and Dec #3, and the monitor circuits Mon #1 to Mon #4 are provided. Each of the AMZs 1b and 1c is optically connected to the post stage of the AMZ 1a. Each of the AMZs 1d and 1g is optically connected to the post stage of the AMZs 1b and 1c. An input port Pin to which a wavelength light or a wavelength multiplexing signal light is input is provided at an input end of the AMZ 1a.

The monitor circuits Mon #1 and Mon #3 are optically respectively connected to the output ports of the output couplers Cb of the AMZs 1b and 1c via a branch coupler CP.

The monitor circuit Mon #1 monitors the power of the output light output from the AMZ 1*b* to the AMZ 1*d*. The monitor circuit Mon #1 notifies the compensation circuit Inc #1 of the power that is a monitoring result. The monitor circuit Mon #3 monitors the power of the output light output from the AMZ 1*c* to the AMZ 1*g*. The monitor circuit Mon #3 notifies the compensation circuit Inc #1 of the power that is a monitoring result.

The monitor circuits Mon #2 and Mon #4 are optically respectively connected to the another output ports of the output couplers Cb of the AMZ 1*b* and 1*c*. Each of the monitor circuits Mon #2 and Mon #4 monitors the power of the output light output from the another output port of the output coupler Cb. The monitor circuit Mon #2 notifies the compensation circuit Dec #1 of the power that is a monitoring result. The monitor circuit Mon #4 notifies the compensation circuit Dec #2 of the power that is a monitoring result.

The compensation circuit Inc #1 controls adjustment amounts of the optical phases for the phase shifters Hu and Hd of the AMZ 1*a* according to the respective monitoring results of the output light by the monitor circuits Mon #1 and Mon #3. The compensation circuit Dec #1 controls adjustment amounts of the optical phases for the phase shifters Hu and Hd of the AMZ 1*b* according to the monitoring result of the output light by the monitor circuit Mon #2. The compensation circuit Dec #2 controls adjustment amounts of the optical phases for the phase shifters Hu and Hd of the AMZ 1*c* according to the monitoring result of the output light by the monitor circuit Mon #4.

With the configuration described above, the power of the output light output from the output ports of the output couplers Cb of the AMZs 1*b* and 1*c* to the post stage AMZs 1*d* and 1*g* increases, and the power of the output light output from the another output ports of the output couplers Cb of the AMZs 1*b* and 1*c* to the monitor circuits Mon #2 and Mon #4 decreases.

In the post-stage demultiplexing circuit 12, the AMZs 1*d* to 1*f*, the compensation circuits Inc #2 and Dec #3 and Dec #4, and the monitor circuits Mon #5 to Mon #8 are provided. Each of the AMZs 1*e* and 1*f* is optically connected to the post stage of the AMZ 1*d*. Output ports P #1 and P #2 to which branched light is output are respectively provided in the output ports of the output couplers Cb of the AMZs 1*e* and 1*f*.

The monitor circuits Mon #5 and Mon #7 are optically respectively connected to the output ports of the output couplers Cb of the AMZs 1*e* and 1*f* via the branch coupler CP. The monitor circuit Mon #5 monitors power of the output light output from the AMZ 1*e* to the output port P #1. The monitor circuit Mon #5 notifies the compensation circuit Inc #2 of the power that is a monitoring result. The monitor circuit Mon #7 monitors the power of the output light output from the AMZ 1*f* to the output port P #2. The monitor circuit Mon #7 notifies the compensation circuit Inc #2 of the power that is a monitoring result.

The monitor circuits Mon #6 and Mon #8 are optically respectively connected to the another output ports of the output couplers Cb of the AMZ 1*e* and 1*f*. Each of the monitor circuits Mon #6 and Mon #8 monitors the power of the output light output from the another output port of the output coupler Cb. The monitor circuit Mon #6 notifies the compensation circuit Dec #3 of the power that is a monitoring result. The monitor circuit Mon #8 notifies the compensation circuit Dec #4 of the power that is a monitoring result.

The compensation circuit Inc #2 controls adjustment amounts of the optical phases of the phase shifters Hu and Hd of the AMZ 1*d* according to the respective output light monitoring results by the monitor circuits Mon #5 and Mon #7. The compensation circuit Dec #3 controls adjustment amounts of the optical phases of the phase shifters Hu and Hd of the AMZ 1*e* according to the output light monitoring result by the monitor circuit Mon #6. The compensation circuit Dec #4 controls adjustment amounts of the optical phases of the phase shifters Hu and Hd of the AMZ 1*f* according to the output light monitoring result by the monitor circuit Mon #8.

With the configuration described above, the power of the output light output from the output ports of the output couplers Cb of the AMZs 1*e* and 1*f* to the post-stage output ports P #1 and P #2 increases, and the power of the output light output from the another output ports of the output couplers Cb of the AMZs 1*e* and 1*f* to the monitor circuits Mon #6 and Mon #8 decreases.

In the post-stage demultiplexing circuit 13, the AMZs 1*g* to 1*i*, the compensation circuits Inc #3 and Dec #5 and Dec #6, the monitor circuits Mon #9 to Mon #12 are provided. Each of the AMZs 1*h* and 1*i* is optically connected to the post stage of the AMZ 1*g*. Output ports P #3 and P #4 to which branched light is output are respectively provided in the output ports of the output couplers Cb of the AMZs 1*h* and 1*i*.

The monitor circuits Mon #9 and Mon #11 are optically respectively connected to the output ports of the output couplers Cb of the AMZs 1*h* and 1*i* via the branch coupler CP. The monitor circuit Mon #9 monitors each power of the output light output from the AMZ 1*h* to the output port P #3. The monitor circuit Mon #9 notifies the compensation circuit Inc #3 of the power that is a monitoring result. The monitor circuit Mon #12 monitors the power of the output light output from the AMZ 1*i* to the output port P #4. The monitor circuit Mon #11 notifies the compensation circuit Inc #3 of the power that is a monitoring result.

The monitor circuits Mon #10 and Mon #12 are optically respectively connected to the another output ports of the output couplers Cb of the AMZ 1*h* and 1*i*. Each of the monitor circuits Mon #10 and Mon #12 monitors the power of the output light output from the another output port of the output coupler Cb. The monitor circuit Mon #10 notifies the compensation circuit Dec #5 of the power that is a monitoring result. The monitor circuit Mon #12 notifies the compensation circuit Dec #6 of the power that is a monitoring result.

The compensation circuit Inc #3 controls adjustment amounts of the optical phases of the phase shifters Hu and Hd of the AMZ 1*g* according to the respective output light monitoring results by the monitor circuits Mon #9 and Mon #11. The compensation circuit Dec #5 controls adjustment amounts of the optical phases of the phase shifters Hu and Hd of the AMZ 1*h* according to the output light monitoring result by the monitor circuit Mon #10. The compensation circuit Dec #6 controls adjustment amounts of the optical phases of the phase shifters Hu and Hd of the AMZ 1*i* according to the output light monitoring result by the monitor circuit Mon #12.

With the configuration described above, the power of the output light output from the output ports of the output couplers Cb of the AMZs 1*h* and 1*i* to the post-stage output ports P #3 and P #4 increases, and the power of the output light output from the another output ports of the output couplers Cb of the AMZs 1*h* and 1*i* to the monitor circuits Mon #10 and Mon #12 decreases.

In this way, the pre-stage demultiplexing circuit 11 and the post-stage demultiplexing circuits 12 and 13 are connected in multiple stages in a tree-like shape so that the wavelength lights with the center wavelengths λa to λd are respectively input from the AMZ 1a to the AMZs 1 and 1b and are respectively input from the AMZs 1b and 1c to the different AMZs 1d and 1g at the post stage. Wavelength spacings of transmission bands of the AMZs 1a to 1i are determined according to arm length differences thereof. More specifically, the wavelength spacings of the transmission bands of the AMZs 1a to 1i are substantially inversely proportional to the arm length differences thereof.

The arm length difference of the AMZs 1a to 1c are set so that the wavelength spacing of the transmission band is a wavelength spacing Δλ of the center wavelengths λa to λd. The arm length difference between the AMZs 1d to 1f and the AMZs 1g to 1i is set to be ½ times of the arm length difference of the AMZs 1a to 1c so that the wavelength spacing of the transmission band becomes twice of the center wavelength spacing Δλ (2×Δλ).

As a result, the pre-stage demultiplexing circuit 11 demultiplexes multiplexed light of the respective wavelength lights with the center wavelengths λa to λd into multiplexed light of the respective wavelength lights with the center wavelengths λa and λc and multiplexed light of the respective wavelength lights with the center wavelengths λb and λd, and the post-stage demultiplexing circuits 12 and 13 demultiplex each multiplexed light into the wavelength light for each of the center wavelengths λa to λd.

At this time, the output ports P #1 to P #4 of the wavelength lights with the center wavelengths λa to λd are randomly determined according to an initial optical phase in the pair of arms Au and λd of each of the AMZs 1a to 1i. For example, there is a case where the wavelength light with the center wavelength λa is output from the output port P #1, and the wavelength light with the center wavelength λc is output from the output port P #2, the wavelength light with the center wavelength λb is output from the output port P #3, and the wavelength light with the center wavelength λd is output from the output port P #4. However, combinations of the wavelength lights with the center wavelengths λa to λd and the output ports P #1 to P #4 are not constant. As illustrated in parentheses, there is also case where the wavelength light with the center wavelength λd is output from the output port P #1, the wavelength light with the center wavelength λb is output from the output port P #2, the wavelength light with the center wavelength λc is output from the output port P #3, and the wavelength light with the center wavelength λa is output from the output port P #4.

Therefore, it is not possible to output the wavelength light with the respective center wavelengths λa to λd to an arbitrary output destination, and it is difficult to execute appropriate signal processing for each wavelength light.

On the other hand, as described below, by inputting a wavelength light with a specific center wavelength of the center wavelengths λa to λd to the optical demultiplexer 1 and operating only the compensation circuits Inc #1 to Inc #3 and Dec #1 to Dec #6 on a route from the input port Pin to any one of the output ports P #1 to P #4, it is possible to allocate the light with the specific center wavelength to any one of the output ports P #1 to P #4.

Figure 2:
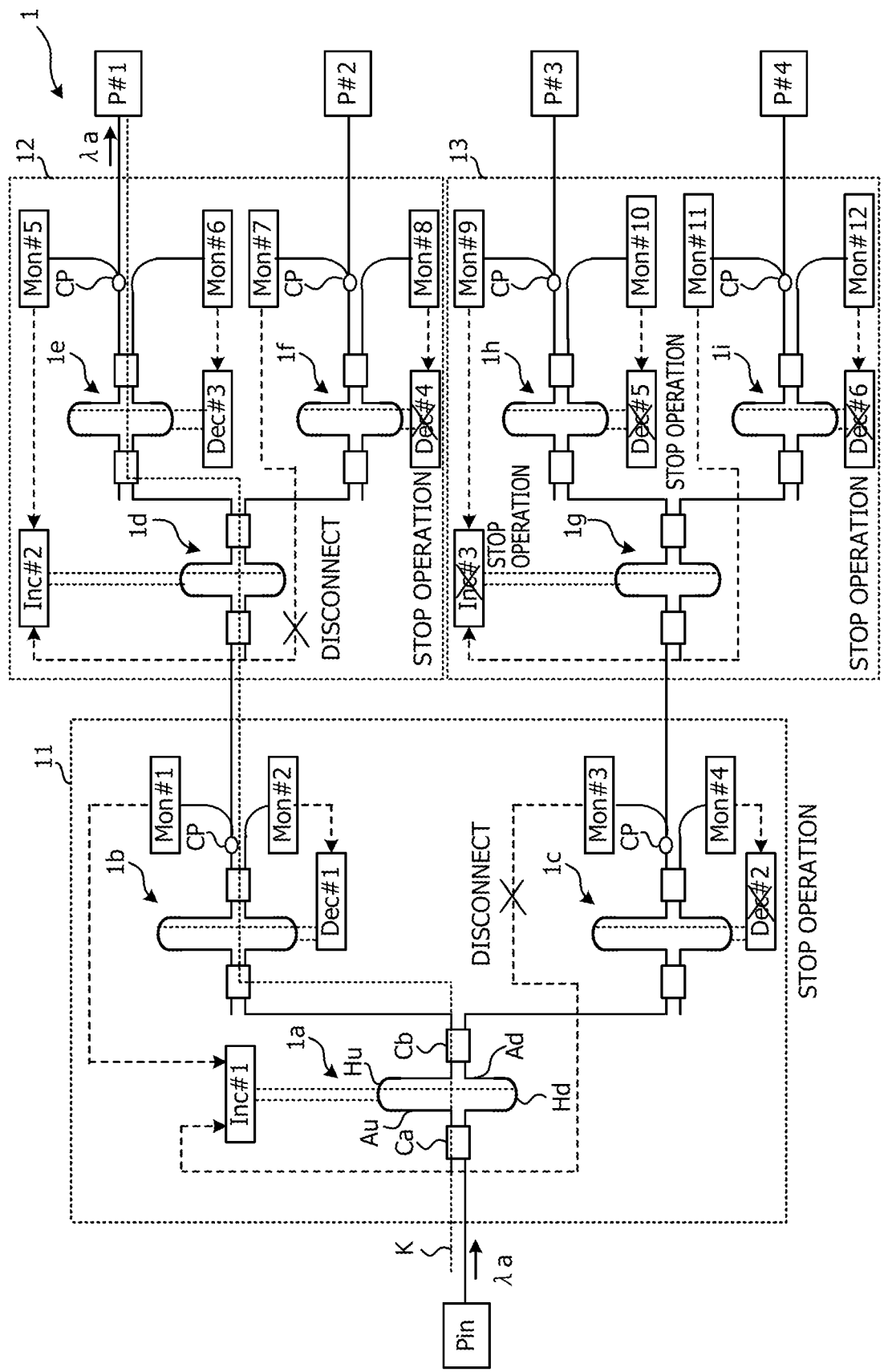
FIG. 2 is a diagram illustrating an example of a method for allocating wavelength lights to output ports of the optical demultiplexer.

FIG. 2 is a diagram illustrating an example of a method for allocating wavelength lights to the output ports P #1 to P #4 of the optical demultiplexer 1. In FIG. 2, the component same as that in FIG. 1 is denoted by the same reference numeral, and description thereof will be omitted.

In this example, a method for allocating the output port P #1 to the wavelength light with the center wavelength λa will be exemplified. Only the wavelength light with the center wavelength λa of the center wavelengths λa to λd is input to the input port Pin. The compensation circuits Inc #1 and Dec #1 and Dec #3 on a route K connecting the input port Pin and the output port P #1 operate and the other compensation circuits Inc #3 and Dec #2 and Dec #4 to Dec #6 stop operations so that the wavelength light with the center wavelength λa is output from the output port P #1. Furthermore, connection between the monitor circuits Mon #3 and Mon #7 and the compensation circuits Inc #1 and Inc #2 is disconnected so that the monitoring results of the monitor circuits Mon #3 and Mon #7 in a portion other than the route K do not affect control of the compensation circuits Inc #1 and Inc #2.

By controlling the optical phase along the route K in this way, it is possible to intentionally guide the wavelength light with the center wavelength λa to the output port P #1. Furthermore, by controlling the optical phase as in the above, any one of the output ports P #2 to P #4 can be allocated to each of the wavelength lights with the other center wavelengths λb to λd.

However, when a circuit that realizes the method described above is provided in the optical demultiplexer 1, a size and cost increase. Therefore, in the following embodiment, the wavelength lights output from the respective output ports P #1 to P #4 are detected, and an electrical cross connect switch that selects an output destination of the wavelength light or an input source of a data signal that is a modulation source of the wavelength light is switched on the basis of a detection result. As a result, appropriate signal processing according to the center wavelengths λa to λd is executed on each wavelength light.

First Embodiment

Figure 3:
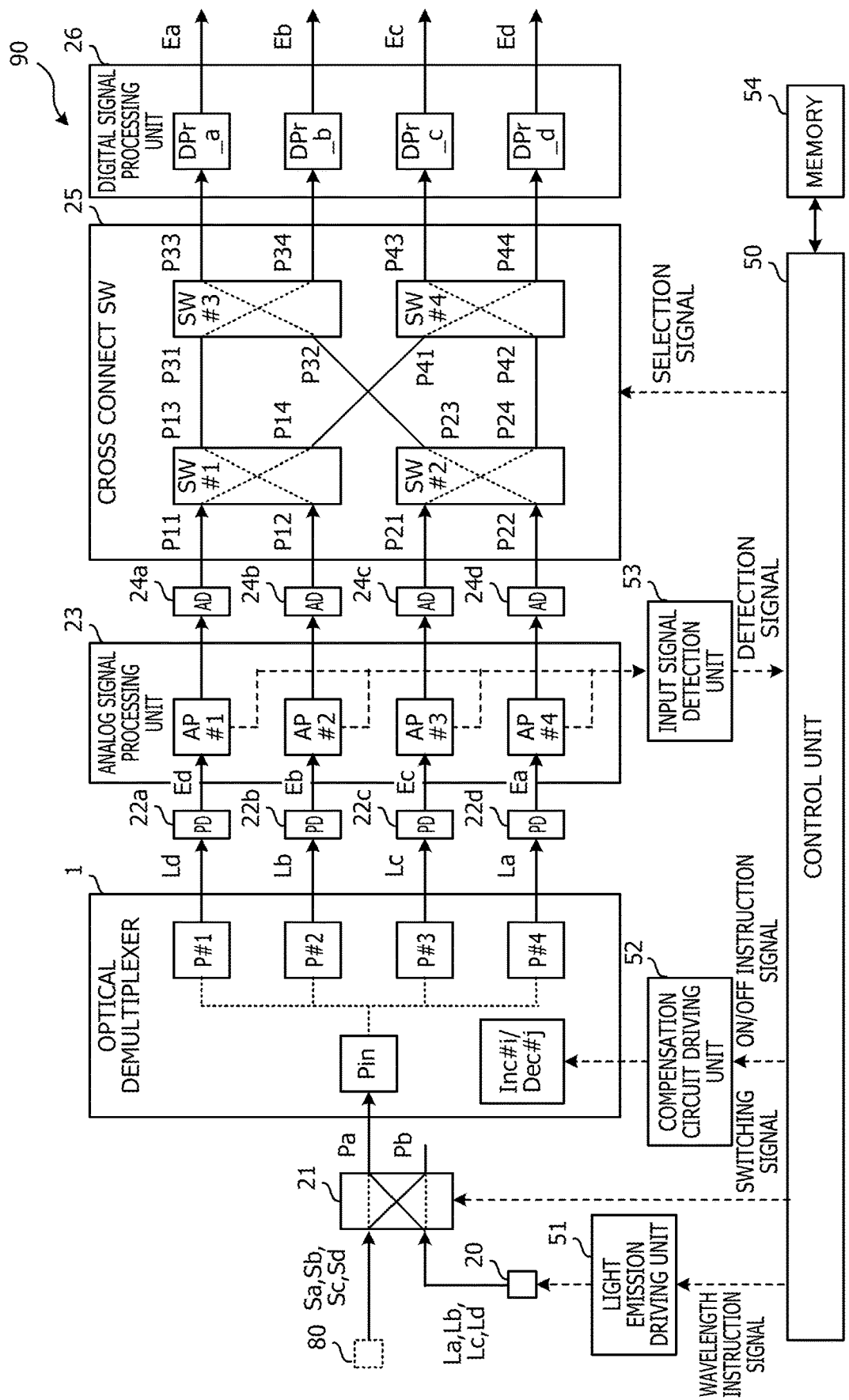
FIG. 3 is a configuration diagram illustrating an optical demultiplexing device according to a first embodiment.

FIG. 3 is a configuration diagram illustrating an optical demultiplexing device 90 according to a first embodiment. The optical demultiplexing device 90 is mounted, for example, on a transmission device and demultiplexes signal lights Sa to Sd that are input from a transmitting device 80 via a transmission path (not illustrated) such as an optical fiber for each of center wavelengths λa to λd and executes signal processing.

The optical demultiplexing device 90 includes a light source 20, an optical switch 21, the optical demultiplexer 1, photodiodes (PD) 22a to 22d, an analog signal processing unit 23, analog-digital converters (AD) 24a to 24d, a cross connect switch (SW) 25, and a digital signal processing unit 26. Furthermore, the optical demultiplexing device 90 includes a control unit 50, a light emission driving unit 51, a compensation circuit driving unit 52, an input signal detection unit 53, and a memory 54. The light emission driving unit 51, the compensation circuit driving unit 52, the input signal detection unit 53, the analog signal processing unit 23, and the digital signal processing unit 26 are implemented, for example, by a FPGA, an ASIC, or the like. The control unit 50 is implemented by a circuit or the like including a processor such as a central processing unit (CPU) or the like.

The optical switch 21 includes two input ports and output ports Pa and Pb. A wavelength multiplexing signal light of the plurality of signal lights Sa to Sd is input from the transmitting device 80 to one of the input ports, and wavelength lights La to Ld are input from the light source 20 to the another input port.

The light source 20 is a multi-wavelength light source and is an example of a first light source that outputs the wavelength lights La to Ld. The light emission driving unit 51 drives the light source 20 in response to a wavelength instruction signal input from the control unit 50. The light source 20 outputs the wavelength lights La to Ld with the center wavelengths λa to λd instructed by the wavelength instruction signal. Note that the control unit 50 is an example of a first control unit that controls the light source 20 and the cross connect switch 25.

Figure 4:
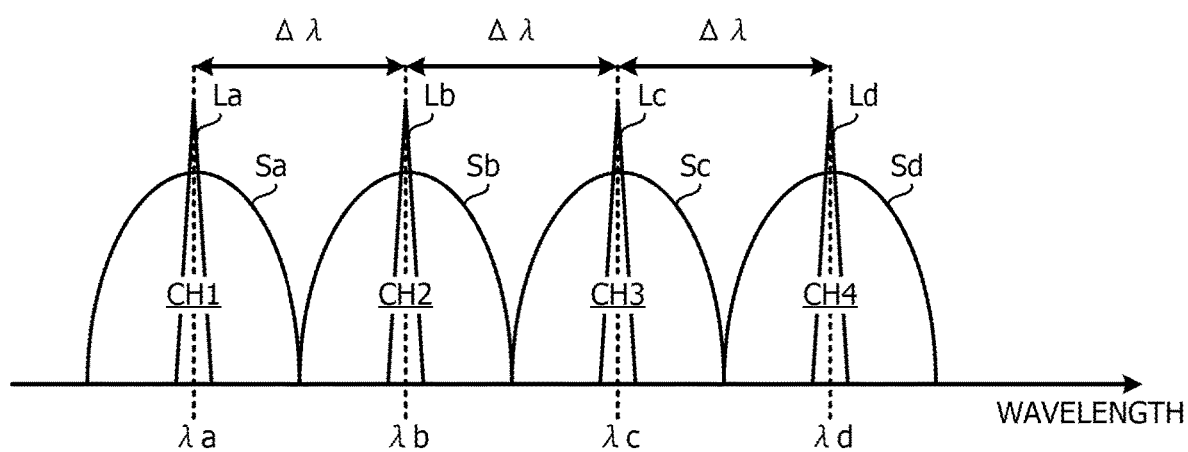
FIG. 4 is a diagram illustrating an example of a wavelength multiplexing signal light and a wavelength light spectrum.

FIG. 4 is a diagram illustrating an example of wavelength multiplexing signal lights and spectra of the wavelength lights La to Ld. The horizontal axis of FIG. 4 indicates a wavelength.

The wavelength multiplexing signal lights include the signal lights Sa to Sd of which the center wavelengths λa to λd match the wavelength lights La to Ld. For example, the center wavelength λa of the signal light Sa matches the center wavelength λa of the wavelength light La, the center wavelength λb of the signal light Sb matches the center wavelength λb of the wavelength light Lb, the center wavelength λc of the signal light Sc matches the center wavelength λc of the wavelength light Lc, and the center wavelength λd of the signal light Sd matches the center wavelength λd of the wavelength light Ld. Spacings Δλ between the center wavelengths λa to λd are constant.

For example, channels CH1 to CH4 for wavelength multiplexing transmission are respectively allocated to the signal lights Sa to Sd. The transmitting device 80 generates a wavelength multiplexing signal light by optically modulating light with each of the center wavelengths λa to λd and multiplexing the wavelengths in response to a main signal of each of the channels CH1 to CH4.

Referring to FIG. 3 again, the optical switch 21 switches the output ports Pa and Pb that output the wavelength multiplexing signal light and the wavelength lights La to Ld in response to a switching signal input from the control unit 50. The one output port Pa is optically connected to the input port Pin of the optical demultiplexer 1, and the another output port Pb is opened. In a case where setting of the cross connect switch 25 is performed, the control unit 50 switches the optical switch 21 so that the wavelength lights La to Ld are output from the output port Pa.

The wavelength lights La to Ld are input from the light source 20 into the optical demultiplexer 1 and are demultiplexed. The AMZs 1a to 1i of the optical demultiplexer 1 are connected to each other so that the wavelength lights La and Ld are respectively output to the PDs 22a to 22d different from each other. Note that, in FIG. 3 and the following drawings, for convenience, illustration of the AMZs 1a to 1i of the optical demultiplexer 1 or the like is omitted.

The compensation circuit driving unit 52 starts or stops operations of compensation circuits Inc #i and Dec #j (i=1 to 3, j=1 to 6) in response to an on/off instruction signal input from the control unit 50. In a case where the on/off instruction signal indicates on, the compensation circuit driving unit 52 makes the compensation circuits Inc #i and Dec #j start the operation, and in a case where the on/off instruction signal indicates off, the compensation circuit driving unit 52 makes the compensation circuits Inc #i and Dec #j stop the operation.

Prior to the setting of the cross connect switch 25, the control unit 50 makes the light source 20 output all the wavelength lights La to Ld to the optical demultiplexer 1 and further makes all the compensation circuits Inc #i and Dec #j start the operation. Optical phases of the output wavelength lights La to Ld input to the optical demultiplexer 1 are compensated by the compensation circuits Inc #i and Dec #j, and the wavelength lights La to Ld are randomly output from one of the output ports P #1 to P #4. As a result, the output ports P #1 to P #4 are allocated to the respective wavelength lights La to Ld.

In this example, it is assumed that the wavelength light Ld be output from the output port P #1, the wavelength light Lb be output from the output port P #2, the wavelength light Lc be output from the output port P #3, and the wavelength light La be output from the output port P #4. After the output ports P #1 to P #4 are allocated to the respective wavelength lights La to Ld, the control unit 50 makes all the compensation circuits Inc #i and Dec #j stop the operation and makes the light source 20 output each of the wavelength lights La to Ld to the optical demultiplexer 1 one by one. The wavelength lights La to Ld are input from the optical demultiplexer 1 to the PDs 22a to 22d.

The PD 22a converts the wavelength light Ld into an electrical signal Ed, and the PD 22b converts the wavelength light Lb into an electrical signal Eb. The PD 22c converts the wavelength light Lc into an electrical signal Ec, and the PD 22d converts the wavelength light La into an electrical signal Ea. The PDs 22a to 22d are examples of a plurality of conversion units. The wavelength lights La to Ld are input from the PDs 22a to 22d to the analog signal processing unit 23.

The analog signal processing unit 23 includes analog circuits AP #1 to AP #4 that respectively execute analog signal processing on the electrical signals Ea to Ed. As the analog circuits AP #1 to AP #4, a clock extraction circuit is exemplified. However, the analog circuits are not limited to this.

The electrical signal Ed is input to the analog circuit AP #1, and the electrical signal Eb is input to the analog circuit AP #2. The electrical signal Ec is input to the analog circuit AP #3, and the electrical signal Ea is input to the analog circuit AP #4. The analog circuits AP #1 to AP #4 notify the input signal detection unit 53 of whether or not the electrical signals Ed, Eb, Ec, and Ea are input. The wavelength lights La to Ld are input from the analog signal processing unit 23 to the ADs 24a to 24d.

The ADs 24a to 24d convert the electrical signals Ed, Eb, Ec, and Ea from analog signals into digital signals. The electrical signals Ed, Eb, Ec, and Ea are input from the ADs 24a to 24d to the cross connect switch 25.

The cross connect switch 25 is an example of a first switch unit and selects an output destination of each of the electrical signals Ea to Ed from among a plurality of output destinations. The digital signal processing unit 26 is connected to the post stage of the cross connect switch 25, and the digital signal processing unit 26 includes digital circuits DPr_a and DPr_d that respectively execute digital signal processing on the electrical signals Ea to Ed. The cross connect switch 25 selects any one of the digital circuits DPr_a to DPr_d as the output destination of each of the electrical signals Ea to Ed in response to a selection signal input from the control unit 50.

The cross connect switch 25 includes 2×2 switches SW #1 to SW #4 as an example. The switches SW #1 to SW #4 are, for example, Banyan switches. The switch SW #1 includes input ports P11 and P12 and output ports P13 and P14, and the switch SW #2 includes input ports P21 and P22 and output ports P23 and P24. The switch SW #3 includes input ports P31 and P32 and output ports P33 and P34, and the switch SW #4 includes input ports P41 and P42 and output ports P43 and P44.

The switches SW #3 and SW #4 are connected to post stages of the switches SW #1 and SW #2. The input ports P11 and P12 of the switch SW #1 are respectively connected to the ADs 24a and 24b, and the output ports P13 and P14 of the switch SW #1 are respectively connected to the input port P31 of the switch SW #3 and the input port P41 of the switch SW #4. The input ports P21 and P22 of the switch SW #2 are respectively connected to the ADs 24c and 24d, and the output ports P23 and P24 of the switch SW #2 are respectively connected to the input port P32 of the switch SW #3 and the input port P42 of the switch SW #4.

Furthermore, the output ports P33 and P34 of the switch SW #3 are respectively connected to the digital circuits DPr_a and DPr_b. The output ports P43 and P44 of the switch SW #4 are respectively connected to the digital circuits DPr_c and DPr_d.

The switches SW #1 to SW #4 can switch connections between the input ports P11, P12, P21, P22, P31, P32, P41, and P42 and the output ports P13, P14, P23, P24, P33, P34, P43, and P44 in response to the selection signal. Therefore, the cross connect switch 25 can output the electrical signals Ed, Eb, Ec, and Ea input from the ADs 24a to 24d to any one of the digital circuits DPr_a to DPr_d according to the selection signal.

The digital circuits DPr_a to DPr_d are, for example, digital filter circuits and execute digital signal processing to compensate deterioration of each of the wavelength lights La to Ld caused in a transmission path. The digital circuits DPr_a to DPr_d execute the digital signal processing depending on the center wavelengths λa to λd. Therefore, the digital circuit DPr_a is a circuit dedicated to the electrical signal Ea converted from the wavelength light La, the digital circuit DPr_b is a circuit dedicated to the electrical signal Eb converted from the wavelength light Lb, the digital circuit DPr_c is a circuit dedicated to the electrical signal Ec converted from the wavelength light La, and the digital circuit DPr_d is a circuit dedicated to the electrical signal Ea converted from the wavelength light La.

The input signal detection unit 53 is an example of a first detection unit and detects the electrical signals Ed, Eb, Ec, and Ea respectively output from the PDs 22a to 22d. The control unit 50 controls the cross connect switch 25 so that the electrical signals Ea to Ed that the input signal detection unit 53 has detected are output to an output destination according to the wavelength lights La to Ld that are conversion sources of the electrical signals Ea to Ed, of the digital circuits DPr_a to DPr_d.

For example, the input signal detection unit 53 detects the electrical signals Ed, Eb, Ec, and Ea on the basis of notifications from the analog circuits AP #1 to AP #4. The input signal detection unit 53 transmits detection signals respectively indicating the analog circuits AP #1 to AP #4 that are notification sources of the inputs of the electrical signals Ed, Eb, Ec, and Ea, to the control unit 50.

The control unit 50 specifies the output ports P #1 to P #4 of the optical demultiplexer 1 that are connection destinations of the analog circuits AP #1 to AP #4 indicated by the detection signals. The control unit 50 registers a correspondence relationship between the center wavelengths λa to λd of the wavelength lights La to Ld being output, the output ports P #1 to P #4 according to the detection signals, the input ports P11, P12, P21, and P22 that are connection destinations of the output ports P #1 to P #4 and the output ports P33, P34, P43, and P44 of the cross connect switch 25, in a setting table of the cross connect switch 25 in the memory 54.

After compensating the difference between the optical phases of the AMZs 1a to 1i, the control unit 50 sets each of the switches SW #1 to SW #4 in the cross connect switch 25 according to the setting table. For example, the control unit 50 sets connections between the input ports P11, P12, P21, P22, P31, P32, P41, and P42 and the output ports P13, P14, P23, P24, P33, P34, P43, and P44 of the switches SW #1 to SW #4.

For example, the control unit 50 connects the input port P11 and the output port P14 of the switch SW #1 and connects the input port P41 and the output port P44 of the switch SW #4 so that the electrical signal Ed that is input from the output port P #1 of the optical demultiplexer 1 to the input port P11 of the switch SW #1 is output to the digital circuit DPr_d. Furthermore, the control unit 50 connects the input port P22 and the output port P23 of the switch SW #2 and connects the input port P32 and the output port P33 of the switch SW #3 so that the electrical signal Ea input from the output port P #4 of the optical demultiplexer 1 to the input port P22 of the switch SW #2 is output to the digital circuit DPr_a.

Furthermore, the control unit 50 connects the input port P12 and the output port P13 of the switch SW #1 and connects the input port P31 and the output port P34 of the switch SW #3 so that the electrical signal Eb input from the output port P #2 of the optical demultiplexer 1 to the input port P12 of the switch SW #1 is output to the digital circuit DPr_b. Furthermore, the control unit 50 connects the input port P21 and the output port P24 of the switch SW #2 and connects the input port P42 and the output port P43 of the switch SW #4 so that the electrical signal Ec input from the output port P #3 of the optical demultiplexer 1 to the input port P21 of the switch SW #2 is output to the digital circuit DPr_c.

As a result, after respectively being converted into the electrical signals Ea to Ed, the wavelength lights La to Ld are input to the appropriate digital circuits DPr_a to DPr_d according to the center wavelengths λa to λd via the cross connect switch 25. Therefore, the optical demultiplexing device 90 can execute appropriate signal processing for each of the center wavelengths λa to λd

[Operation of Control Unit]

Figure 5:
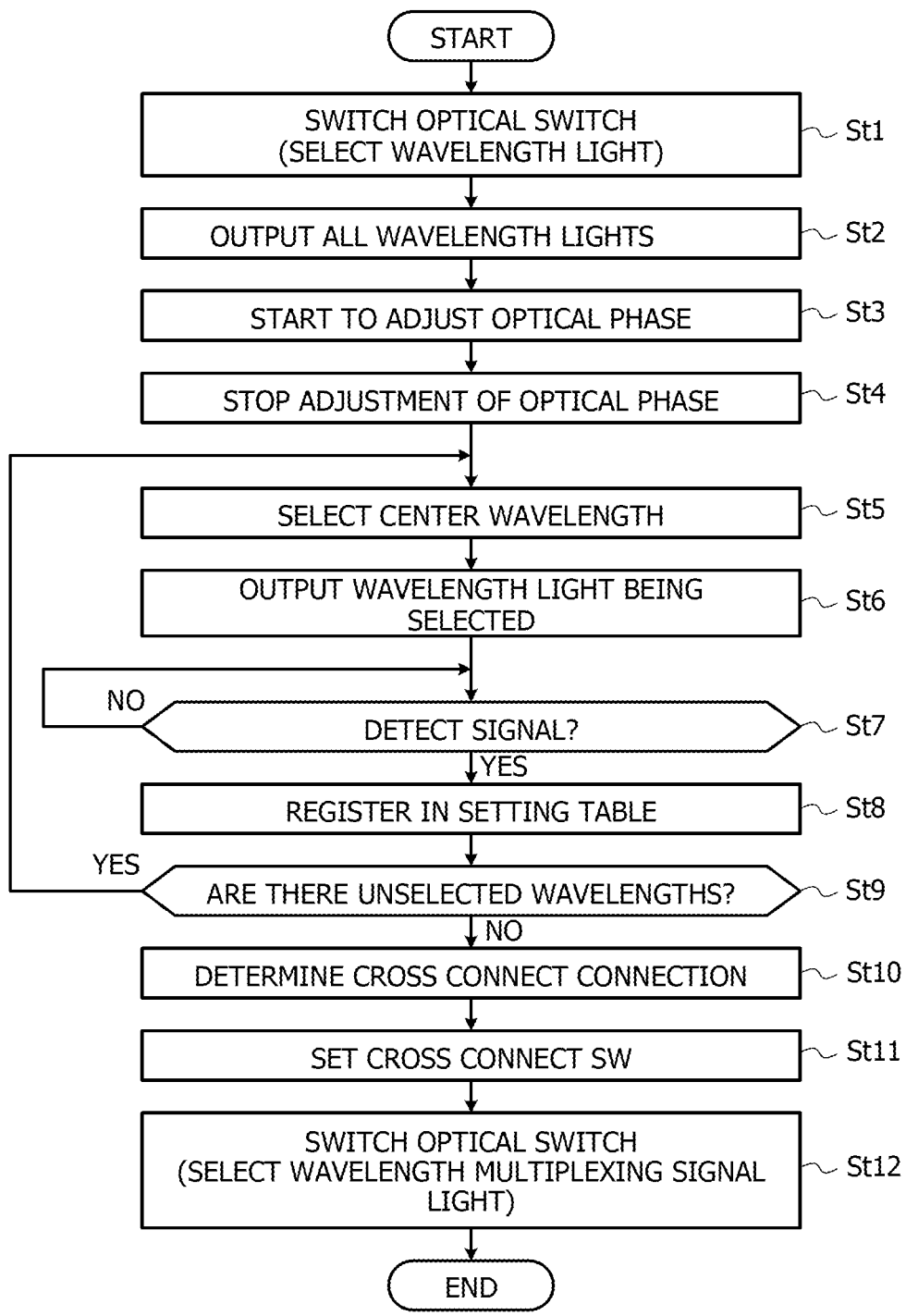
FIG. 5 is a flowchart illustrating an example of an operation of a control unit.

FIG. 5 is a flowchart illustrating an example of an operation of the control unit 50. The control unit 50 performs this operation each time when setting of the cross connect switch 25 is performed.

First, the control unit 50 switches the optical switch 21 so that the wavelength lights La to Ld are input to the optical demultiplexer 1 (operation St1). As a result, the optical switch 21 selects the wavelength lights La to Ld as the output light of the output port Pa.

Next, the control unit 50 controls the light emission driving unit 51 so that all of the wavelength lights La to Ld are output from the light source 20 (operation St2). As a result, all the wavelength lights La to Ld are input to the optical demultiplexer 1 at the same time, and the wavelength lights La to Ld are randomly output from the output ports P #1 to P #4.

Next, the control unit 50 makes the compensation circuits Inc #1 to Inc #3 and Dec #1 to Dec #6 start to control the phase shifters Hu and Hd so that the phase shifters Hu and Hd of each of the AMZs 1a to 1i start to adjust the optical phase (operation St3). As a result, the difference between the optical phases of the respective wavelength lights La to Ld is compensated.

After the compensation of the difference between the optical phases, the control unit 50 makes the compensation circuits Inc #1 to Inc #3 and Dec #1 to Dec #6 stop the control of the phase shifters Hu and Hd so that the phase shifters Hu and Hd of the AMZs 1*a* to 1*i* stop the adjustment of the optical phase (operation St4). Therefore, before the wavelength lights La to Ld are output one by one, the output ports P #1 to P #4 of the optical demultiplexer 1 are associated with the respective wavelength lights La to Ld.

Figure 6:
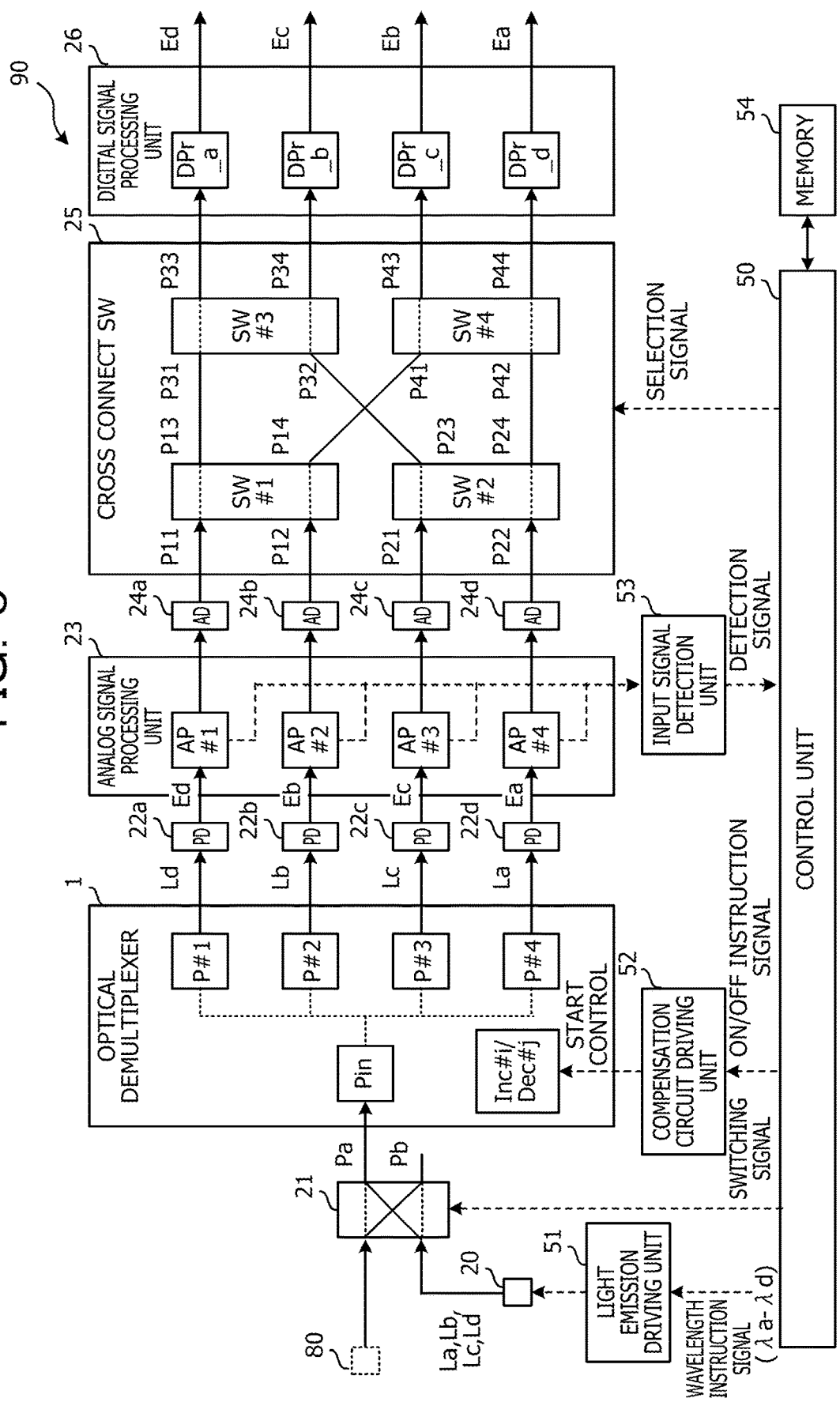
FIG. 6 is a diagram illustrating an example of a state where all wavelength lights are input to the optical demultiplexer.

FIG. 6 is a diagram illustrating an example of a state where all the wavelength lights La to Ld are input to the optical demultiplexer 1. As an example, the wavelength lights La to Ld are demultiplexed by the optical demultiplexer 1, the wavelength light Ld is output from the output port P #1, and the wavelength light Lb is output from the output port P #2. Furthermore, the wavelength light Lc is output from the output port P #3, and the wavelength light La is output from the output port P #4. At this time, the compensation circuits Inc #1 to Inc #3 and Dec #1 to Dec #6 control the phase shifters Hu and Hd. Therefore, in the optical demultiplexer 1, the difference between the optical phases of the wavelength lights La to Ld is compensated by the phase shifters Hu and Hd.

Referring to FIG. 5 again, after the operation in operation St4, the control unit 50 selects one wavelength from among the center wavelengths λa to λd of the wavelength lights La to Ld (operation St5). Note that a selection order of the center wavelengths λa to λd is not limited. Next, the control unit 50 controls the light emission driving unit 51 so as to output only the wavelength lights La to Ld with the center wavelengths λa to λd being selected from the light source 20 (operation St6). As a result, only the wavelength lights La to Ld with the center wavelengths λa to λd being selected are input to the optical demultiplexer 1, and the wavelength lights La to Ld are output from an output port, corresponded in advance, of the output ports P #1 to P #4.

Next, the control unit 50 determines whether or not the electrical signals Ea to Ed are detected by the input signal detection unit 53 (operation St7). By receiving the detection signal from the input signal detection unit 53, the control unit 50 determines whether or not the electrical signals Ea to Ed are detected. In a case where the electrical signals Ea to Ed are not detected (No in operation St7), the processing in operation St7 is executed again.

Furthermore, in a case where the electrical signals Ea to Ed are detected (Yes in operation St7), the control unit 50 registers the output ports P #1 to P #4 of the wavelength lights La to Ld that are the conversion sources of the electrical signals Ea to Ed and the input ports P11, P12, P21, and P22 of the cross connect switch 25 corresponding to those output ports P #1 to P #4 in the setting table in the memory 54 on the basis of the detection signal (operation St8).

Next, the control unit 50 determines whether or not there are unselected center wavelengths λa to λd (operation St9). In a case where there are unselected center wavelengths λa to λd (No in operation St9), the control unit 50 selects the other center wavelengths λa to λd (operation St5) and performs the operation in and subsequent to operation St6 again.

Figure 7:
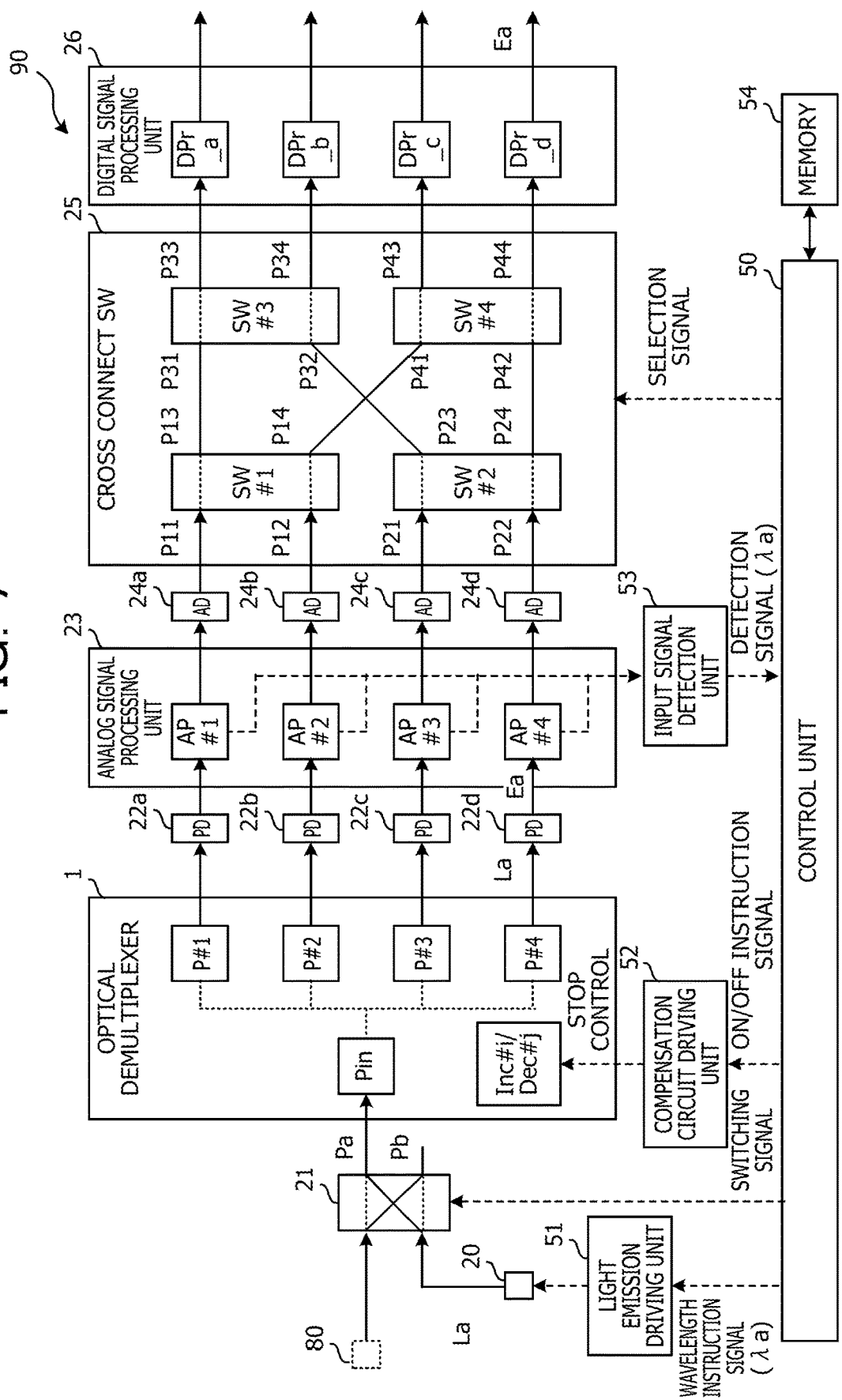
FIG. 7 is a diagram illustrating an example of a state where a wavelength light with a center wavelength being selected is input to the optical demultiplexer.

FIG. 7 is a diagram illustrating an example of a state where the wavelength light La with the center wavelength λa being selected is input to the optical demultiplexer 1. The control unit 50 instructs to output the wavelength light La by transmitting the wavelength instruction signal indicating the center wavelength λa to the light emission driving unit 51. As a result, the light source 20 outputs only the wavelength light La. The wavelength light La is output from the output port P #4 of the optical demultiplexer 1 associated at the time when the difference between the optical phases is compensated and is converted into the electrical signal Ea by the PD 22*d*.

The electrical signal Ea is input to the analog circuit AP #4 of the analog signal processing unit 23. The analog circuit AP #4 notifies the input signal detection unit 53 of the input of the electrical signal Ea. The input signal detection unit 53 transmits a detection signal indicating the detection of the electrical signal Ea and the analog circuit AP #4 that is a notification source to the control unit 50.

FIG. 8 is a diagram illustrating an example of the setting table in the memory 54. In the setting table, the center wavelengths λa to λd of the wavelength lights La to Ld, output port IDs (P #1 to P #4) of the optical demultiplexer 1, input port IDs (P11, P12, P21, and P22) and output port IDs (P33, P34, P43, and P44) of the cross connect switch 25 are registered.

The center wavelengths λa to λd and the output port IDs of the cross connect switch 25 are registered in the setting table in advance. Because the output ports P33, P34, P43, and P44 are respectively connected to the digital circuits DPr_a to DPr_d in a one-to-one relationship, the center wavelengths λa to λd correspond to the output ports P33, P34, P43, and P44 in a one-to-one relationship.

The control unit 50 specifies the output ports P #1 to P #4 of the optical demultiplexer 1 that have output the wavelength lights La to Ld that are the conversion sources of the electrical signals Ea to Ed from the detection signal. Because the analog circuits AP #1 to AP #4 are respectively connected to the output ports P #1 to P #4 in a one-to-one relationship, the control unit 50 can specify the output ports P #1 to P #4 corresponding to the analog circuits AP #1 to AP #4 indicated by the detection signal.

Furthermore, the control unit 50 specifies the input ports P11, P12, P21, and P22 of the cross connect switch 25 corresponding to the specified output ports P #1 to P #4. Because the output ports P #1 to P #4 are respectively connected to the input ports P11, P12, P21, and P22 in a one-to-one relationship, the control unit 50 can specify the input ports P11, P12, P21, and P22 corresponding to the output ports P #1 to P #4.

For example, in a case of selecting the center wavelength λa in operation St5, the control unit 50 receives the detection signal indicating the electrical signal Ea to the analog circuit AP #4. Therefore, the control unit 50 specifies the output port P #4 connected to the analog circuit AP #4 and registers the specified output port P #4 in the setting table. Moreover, the control unit 50 specifies the input port P22 of the cross connect switch 25 corresponding to the output port P #4 and registers the input port P22 in the setting table. Note that, for the other center wavelengths λb to λd, the output port ID of the optical demultiplexer 1 and the input port ID of the cross connect switch 25 are specified with the similar method.

Referring to FIG. 5 again, the control unit 50 determines cross connect connection of the cross connect switch 25 on the basis of the setting table (operation St10) and sets the cross connect connection to the cross connect switch 25 according to a selection signal indicating the connection relationship (operation St11). For example, the control unit 50 performs connection setting between the input port P22 and the output port P33 of the electrical signal Ea on the switches SW #2 and SW #3 so that the electrical signal Ea is output from the output port P33 of the cross connect switch 25. Furthermore, the control unit 50 performs connection setting between the input port P11 and the output port P44 of the electrical signal Ed on the switches SW #1 and SW #4 so that the electrical signal Ed is output from the output port P44 of the cross connect switch 25.

As a result, the electrical signals Ea to Ed are respectively input to the digital circuits DPr_a to DPr_d according to the center wavelengths λa to λd of the wavelength lights La to Ld that are the conversion sources.

Next, the control unit 50 switches the optical switch 21 so that the wavelength multiplexing signal light including the signal lights Sa to Sd is input to the optical demultiplexer 1 (operation St12). For example, the control unit 50 switches an output destination of the wavelength multiplexing signal light to from the output port Pa to the output port Pb.

Figure 9:
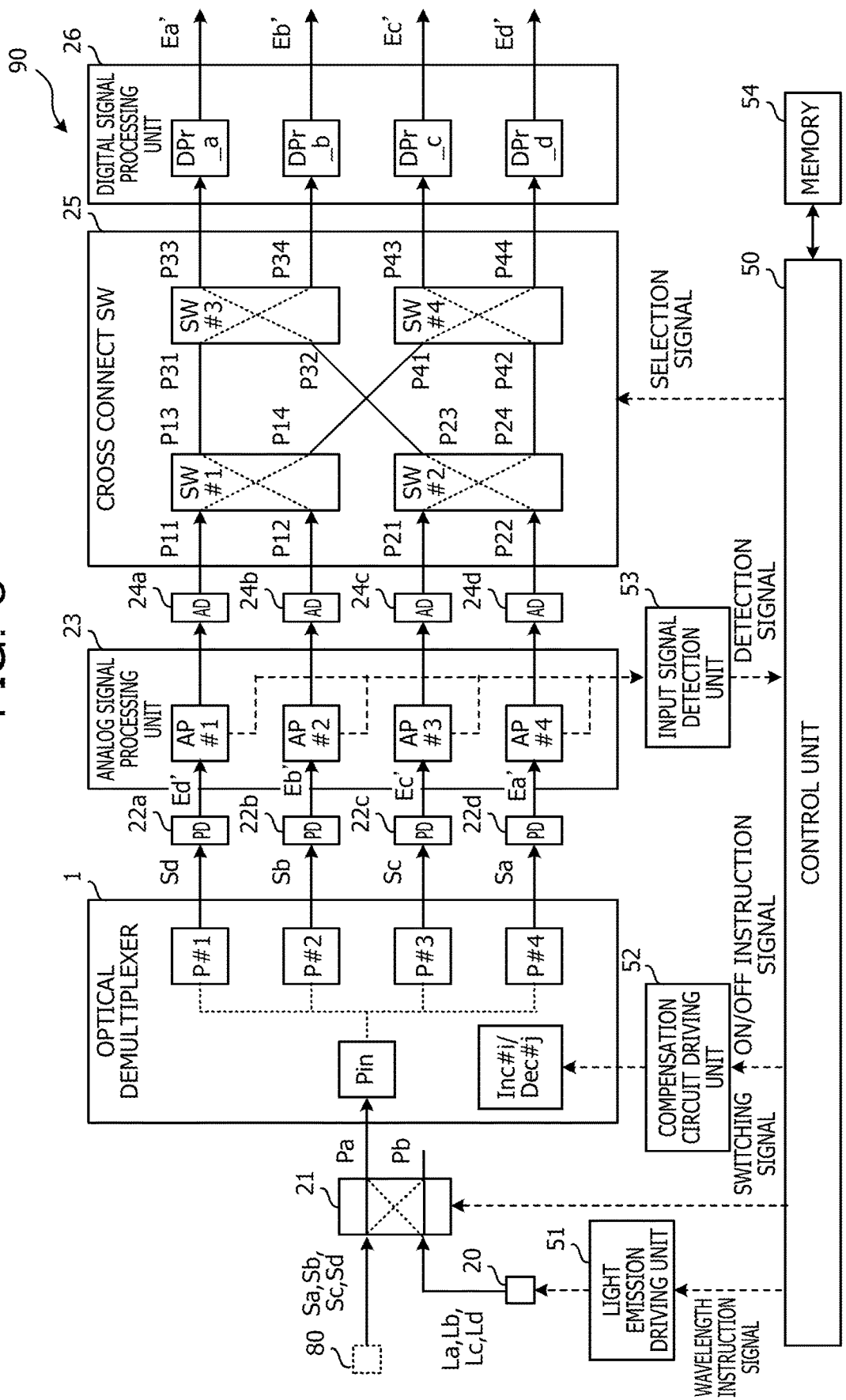
FIG. 9 is a diagram illustrating an example of a state where the wavelength multiplexing signal light is input to the optical demultiplexer.

FIG. 9 is a diagram illustrating an example of a state where the wavelength multiplexing signal light is input to the optical demultiplexer 1. The wavelength multiplexing signal light is demultiplexed into the signal lights Sa to Sd by the optical demultiplexer 1 and is converted into electrical signals Ea' to Ed' by the PDs 22a to 22d. The electrical signals Ea' to Ed' are respectively input to the digital circuits DPr_a to DPr_d via the cross connect switch 25 set as described above. Therefore, appropriate signal processing according to the center wavelengths λa to λd of the signal lights Sa to Sd that are the conversion sources is executed on each of the electrical signals Ea' to Ed'.

Modification of First Embodiment

Figure 10:
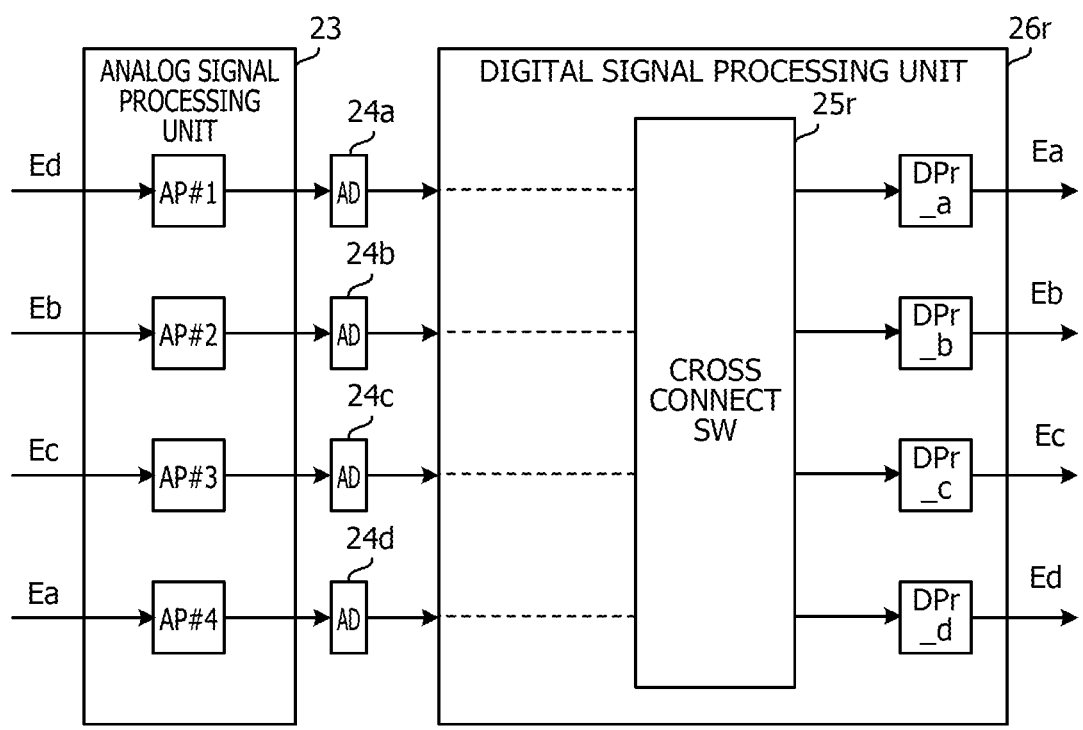
FIG. 10 is a configuration diagram illustrating an example of a digital signal processing unit including a cross connect switch.

FIG. 10 is a configuration diagram illustrating an example of a digital signal processing unit 26r including a cross connect switch 25r. In FIG. 10, the component same as that in FIG. 3 is denoted by the same reference numeral, and description thereof will be omitted.

The digital signal processing unit 26r is provided in an optical demultiplexing device 90 instead of a digital signal processing unit 26 and includes the cross connect switch 25r that is similar to the cross connect switch 25. Furthermore, the digital signal processing unit 26r includes digital circuits DPr_a to DPr_d. The cross connect switch 25r is connected to pre-stage ADs 24a to 24d.

Also in this example, by setting the cross connect switch 25r with a method as described above, a control unit 50 can input electrical signals Ea to Ed to the digital circuits DPr_a to DPr_d according to center wavelengths λa to λd.

Figure 11:
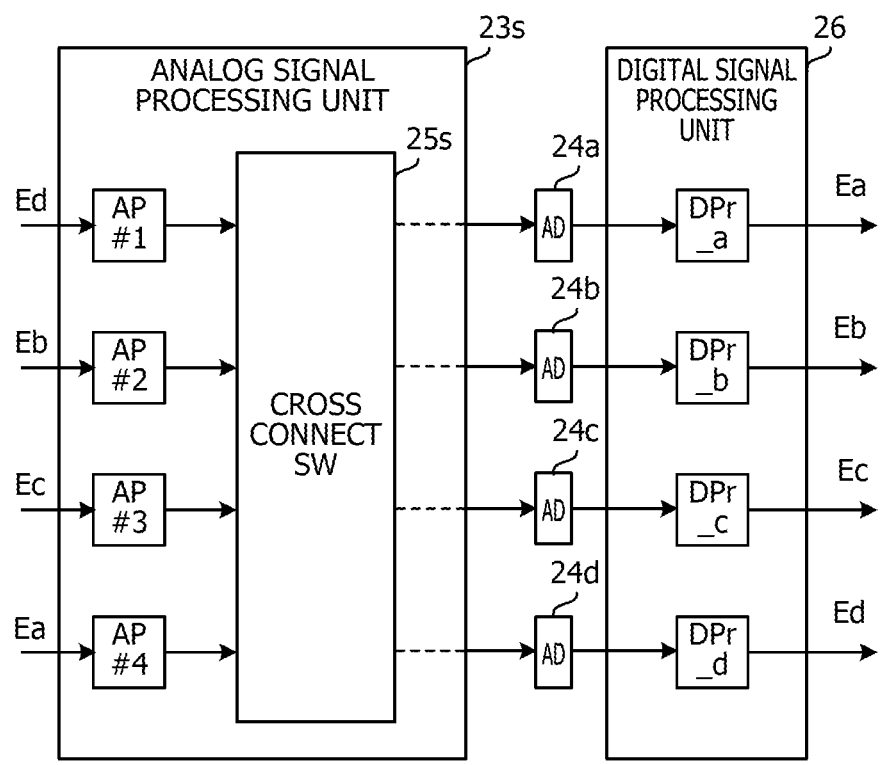
FIG. 11 is a configuration diagram illustrating an example of an analog signal processing unit 2 including a cross connect switch.

FIG. 11 is a configuration diagram illustrating an example of an analog signal processing unit 23s including a cross connect switch 25s. In FIG. 11, the component same as that in FIG. 3 is denoted by the same reference numeral, and description thereof will be omitted.

The analog signal processing unit 23s is provided in the optical demultiplexing device 90 instead of an analog signal processing unit 23 and includes the cross connect switch 25s that is similar to the cross connect switch 25. Furthermore, the analog signal processing unit 23s includes analog circuits AP #1 to AP #4. The analog circuits AP #1 to AP #4 are connected to a pre-stage of the cross connect switch 25s.

Also in this example, by setting the cross connect switch 25s with a method as described above, the control unit 50 can input the electrical signals Ea to Ed to the digital circuits DPr_a to DPr_d according to the center wavelengths λa to λd.

Figure 12:
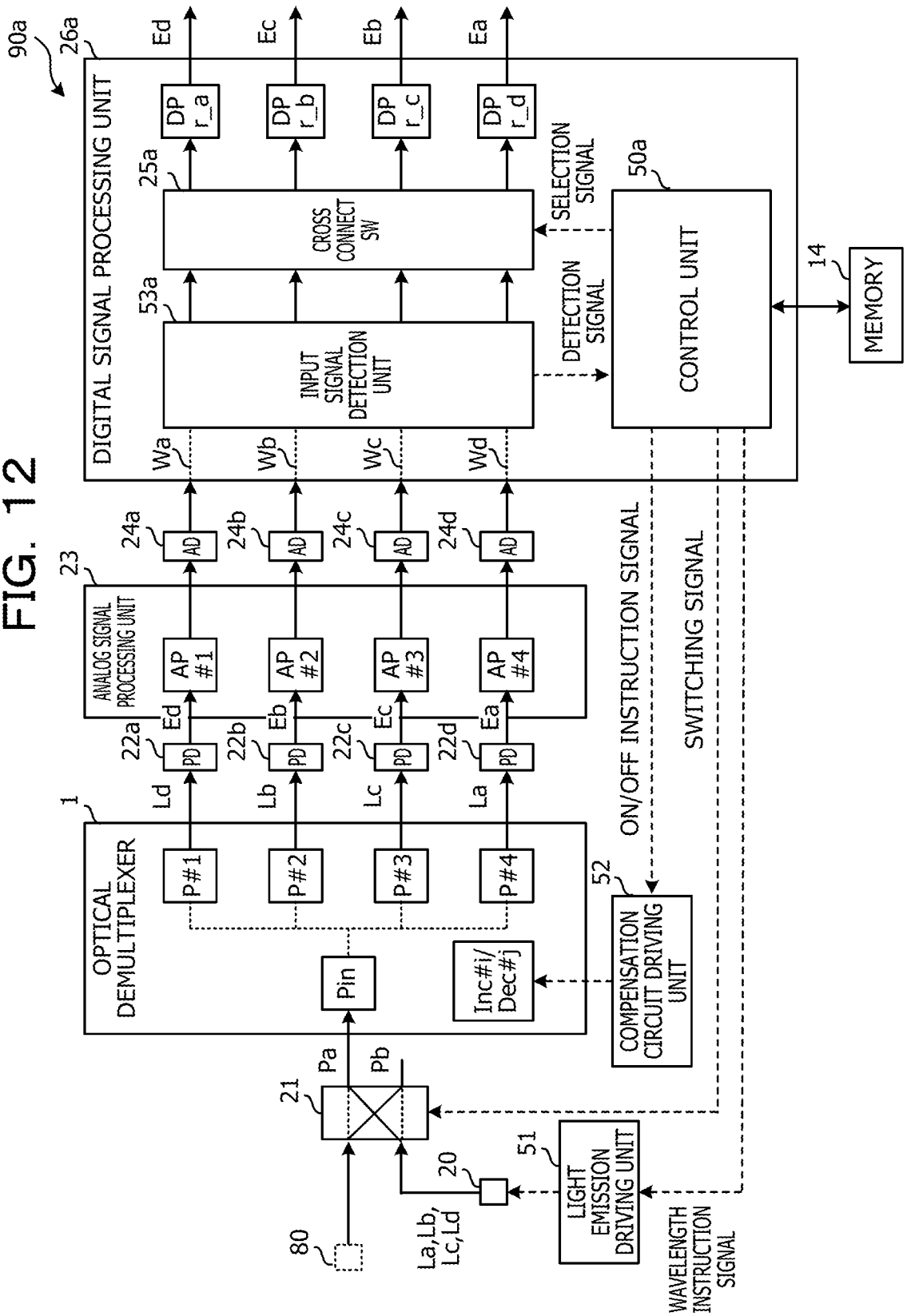
FIG. 12 is a configuration diagram illustrating an example of an optical demultiplexing device that includes a digital signal processing unit including a control unit, an input signal detection unit, and a cross connect switch.

FIG. 12 is a configuration diagram illustrating an example of an optical demultiplexing device 90a that includes a digital signal processing unit 26a including a control unit 50a, an input signal detection unit 53a, and a cross connect switch 25a. In FIG. 12, the component same as that in FIG. 3 is denoted by the same reference numeral, and description thereof will be omitted.

The digital signal processing unit 26a is provided in the optical demultiplexing device 90a instead of the digital signal processing unit 26. The control unit 50a, the input signal detection unit 53a, and the cross connect switch 25a have functions respectively similar to the control unit 50, the input signal detection unit 53, and the cross connect switch 25.

The cross connect switch 25a is connected between the input signal detection unit 53a and the digital circuits DPr_a to DPr_d. The input signal detection unit 53a detects electrical signals Ea to Ed for respective lanes Wa to Wd to which the electrical signals Ea to Ed are respectively transmitted from the ADs 24a to 24d. The input signal detection unit 53a transmits a detection signal indicating analog circuits AP #1 to AP #4 corresponding to the lanes Wa to Wd to the control unit 50a.

Also in this example, by setting the cross connect switch 25a with a method as described above, the control unit 50a can input the electrical signals Ea to Ed to the digital circuits DPr_a to DPr_d according to the center wavelengths λa to λd.

Figure 13:
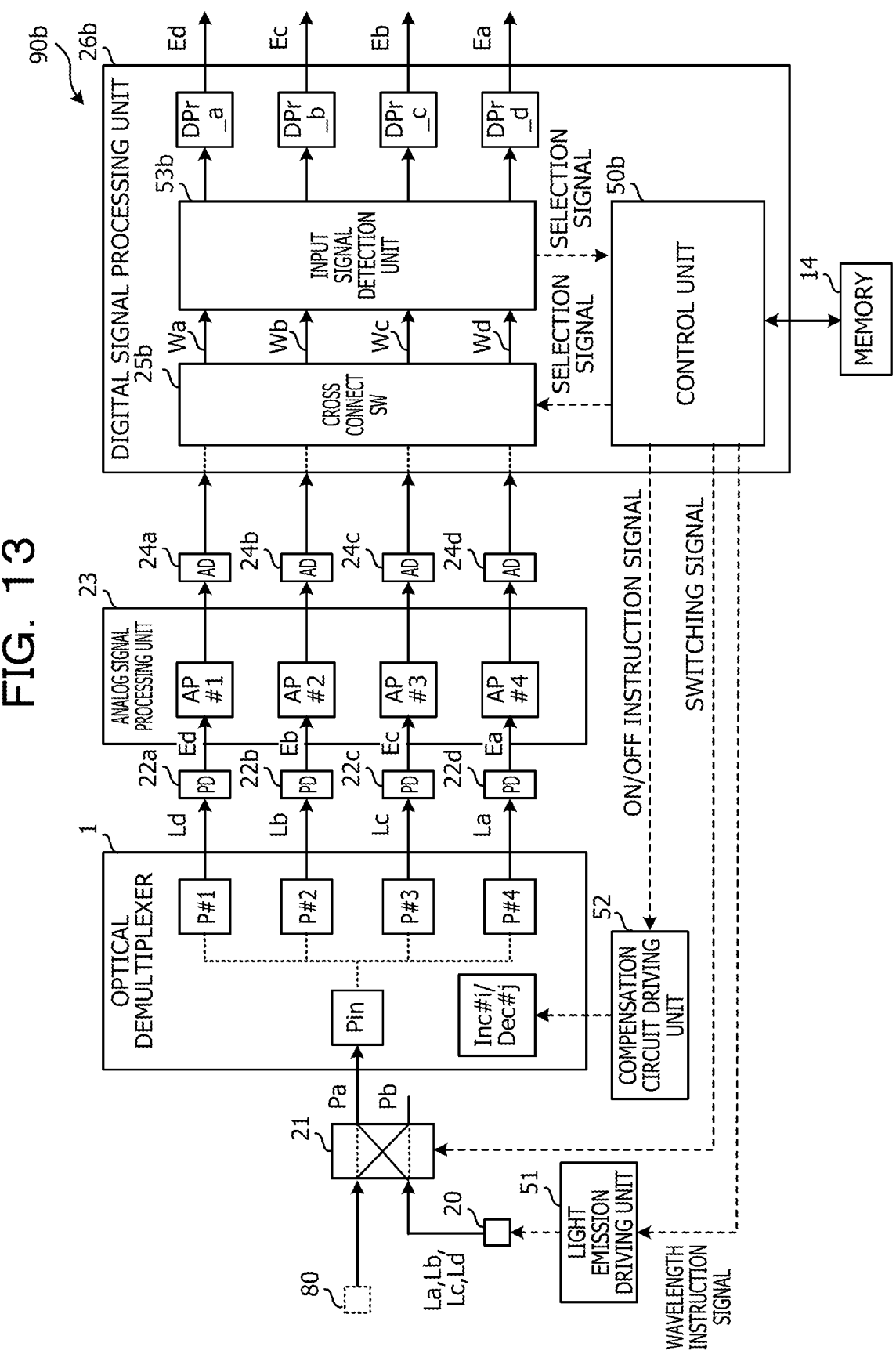
FIG. 13 is a configuration diagram illustrating another example of the optical demultiplexing device that includes the digital signal processing unit including the control unit, the input signal detection unit, and the cross connect switch.

FIG. 13 is a configuration diagram illustrating another example of an optical demultiplexing device 90b that includes a digital signal processing unit 26b including a control unit 50b, an input signal detection unit 53b, and a cross connect switch 25b. In FIG. 13, the component same as that in FIG. 3 is denoted by the same reference numeral, and description thereof will be omitted.

The digital signal processing unit 26b is provided in the optical demultiplexing device 90b instead of the digital signal processing unit 26. The control unit 50b, the input signal detection unit 53b, and the cross connect switch 25b have functions respectively similar to the control unit 50, the input signal detection unit 53, and the cross connect switch 25.

The input signal detection unit 53b is connected between the cross connect switch 25b and the digital circuits DPr_a to DPr_d. The input signal detection unit 53b detects electrical signals Ea to Ed for the respective lanes Wa to Wd to which the electrical signals Ea to Ed are respectively transmitted from the cross connect switch 25b. The input signal detection unit 53b transmits a detection signal indicating the lanes Wa to Wd in which the electrical signals Ea to Ed are detected to the control unit 50b.

The control unit 50b specifies output ports P33, P34, P43, and P44 of the cross connect switch 25b connected to the lanes Wa to Wd indicated by the detection signal. The control unit 50b specifies input ports P11, P12, P21, and P22 that are connected to the specified output ports P33, P34, P43, and P44 and output ports P #1 to P #4 from initial settings of cross connect connection of the cross connect switch 25b.

Also in this example, by setting the cross connect switch 25b with a method as described above, the control unit 50b can input the electrical signals Ea to Ed to the digital circuits DPr_a to DPr_d according to the center wavelengths λa to λd.

However, in a case of this example, because the input ports P11, P12, P21, and P22 and the output ports P #1 to P #4 are specified on the basis of the initial settings of the cross connect connection of the cross connect switch 25b from the lanes Wa to Wd indicated by the detection signal, it takes more time and effort for specifying processing than the example in FIG. 12. Therefore, as in the example in FIG. 12, in a case where the input signal detection unit 53a connected to the pre-stage of the cross connect switch 25a detects the electrical signals Ea to Ed input from the PDs 22a to 22d to the cross connect switch 25, it is easier to specify the input ports P11, P12, P21, and P22 and the output ports P #1 to P #4 than this example.

Second Embodiment

Figure 14:
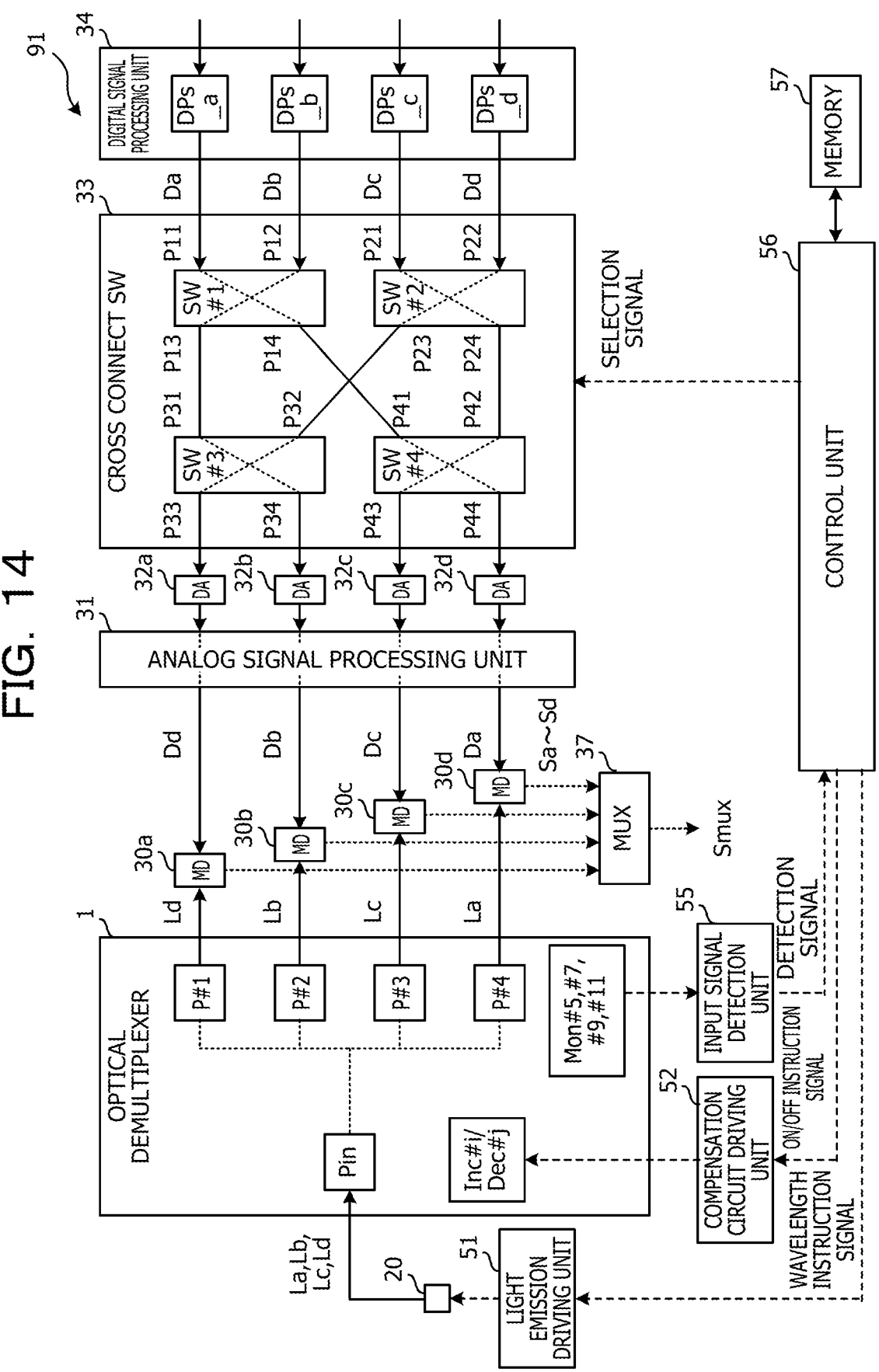
FIG. 14 is a configuration diagram illustrating an optical demultiplexing device according to a second embodiment.

FIG. 14 is a configuration diagram illustrating an optical demultiplexing device 91 according to a second embodiment. In FIG. 14, the component same as that in FIG. 3 is denoted by the same reference numeral, and description thereof will be omitted. The optical demultiplexing device 91 is mounted, for example, on a transmission device and generates a wavelength multiplexing signal light by multiplexing wavelengths of signal lights Sa to Sd with center wavelengths λa to λd at constant spacings and transmits the wavelength multiplexing signal light to a transmission path (not illustrated).

The optical demultiplexing device 91 includes a light source 20, an optical switch 21, an optical demultiplexer 1, optical modulators (MD) 30a to 30d, an analog signal processing unit 31, digital-analog converters (DA) 32a to 32d, a cross connect switch (SW) 33, a digital signal processing unit 34, and a multiplexing unit (MUX) 37. Furthermore, the optical demultiplexing device 91 includes a control unit 56, a light emission driving unit 51, a compensation circuit driving unit 52, an input signal detection unit 55, and a memory 57. The input signal detection unit 55, the analog signal processing unit 31, and the digital signal processing unit 34 are implemented, for example, by a FPGA, an ASIC, or the like. The control unit 56 is implemented by a circuit or the like including a processor such as a CPU or the like.

The light source 20 is an example of a second light source and outputs wavelength lights La to Ld as transmission lights used to generate signal lights Sa and Sb. The control unit 56 instructs center wavelengths λa to λd of the wavelength lights La to Ld to be output, to the light emission driving unit 51 using a wavelength instruction signal. The wavelength lights La to Ld are input to the optical demultiplexer 1. The optical demultiplexer 1 is an example of a second demultiplexing unit and demultiplexes the wavelength lights La to Ld. AMZs 1a to 1i of the optical demultiplexer 1 are connected to each other so that the wavelength lights La to Ld are demultiplexed and respectively output to the MDs 30a to 30d different from each other.

The compensation circuit driving unit 52 starts or stops operations of compensation circuits Inc #i and Dec #j (i=1 to 3, j=1 to 6) in response to an on/off instruction signal input from the control unit 56. Note that the on/off instruction signal is as described above. Prior to setting of the cross connect switch 33, output ports P #1 to P #4 are allocated to the respective wavelength lights La to Ld. Therefore, the control unit 56 makes the light source 20 output all the wavelength lights La to Ld to the optical demultiplexer 1 and further starts the operations of all the compensation circuits Inc #i and Dec #j.

Each of the wavelength lights La to Ld is randomly output from one of the output ports P #1 to P #4 of the optical demultiplexer 1. Also in this example, as in the first embodiment, it is assumed that the wavelength light Ld be output from the output port P #1, the wavelength light Lb be output from the output port P #2, the wavelength light Lc be output from the output port P #3, and the wavelength light La be output from the output port P #4. The wavelength lights La to Ld are respectively input from the output ports P #4, P #2, P #3, and P #4 to the MDs 30d, 30b, 30c, and 30a.

The MDs 30a to 30d optically modulate the wavelength lights Ld, Lb, Lc, and La respectively on the basis of data signals Dd, db, Dc, and Dd. The optically-modulated wavelength lights La to Ld are input to the multiplexing unit 37 as the signal lights Sa to Sd. The multiplexing unit 37 is, for example, an optical coupler and generates a wavelength multiplexing signal light Smux by multiplexing the wavelength lights La to Ld. The wavelength multiplexing signal light Smux is output from the multiplexing unit 37 to a transmission path (not illustrated).

Furthermore, the data signals Dd, db, Dc, and Dd are respectively input from the digital signal processing unit 34 to the MDs 30a to 30d via the cross connect switch 33.

As an example, the digital signal processing unit 34 generates the electrical data signals Da to Dd by executing frame conversion processing or the like on an Ethernet (registered trademark, the same applies hereinafter) signal input from outside. The digital signal processing unit 34 includes digital circuits DPs_a to DPs_d.

The digital circuits DPs_a to DPs_d generate the data signals Da to Dd. The digital circuit DPs_a generates the data signal Da from the Ethernet signal corresponding to a channel CH1 (refer to FIG. 4) with the center wavelength λa. The data signal Da is used to optically modulate the wavelength light La. The digital circuit DPs_b generates the data signal db from the Ethernet signal corresponding to a channel CH2 with the center wavelength λb. The data signal db is used to optically modulate the wavelength light Lb.

The data signal Dc is used to optically modulate the wavelength light Lc. The digital circuit DPs_c generates the data signal Dc from the Ethernet signal corresponding to a channel CH3 with the center wavelength λc. The data signal Dc is used to optically modulate the wavelength light Lc. The digital circuit DPs_d generates the data signal Dd from the Ethernet signal corresponding to a channel CH4 with the center wavelength λd. The data signal Dd is used to optically modulate the wavelength light Ld.

The digital circuits DPs_a to DPs_d are respectively connected to input ports P11, P12, P21, and P22 of the cross connect switch 33. The data signals Da to Dd are respectively input from the input ports P11, P12, P21, and P22 to the cross connect switch 33.

The cross connect switch 33 is an example of a second switch unit and respectively selects digital circuits, which are input sources of the data signals Da to Dd to the MDs 30a to 30d, from among the digital circuits DPs_a to DPs_d that are input sources of the data signals Da to Dd. The cross connect switch 33 includes switches SW #1 to SW #4 connected to each other, similarly to the cross connect switch 25.

Output ports P33, P34, P43, and P44 of the cross connect switch 33 are respectively connected to the DAs 32a to 32d. The cross connect switch 33 selects an input port to be connected to each of the output ports P33, P34, P43, and P44 from among the input ports P11, P12, P21, and P22 according to a selection signal input from the control unit 56.

The DAs 32a to 32d convert data signals input from the output ports P33, P34, P43, and P44, of the data signals Da to Dd, from digital signals into analog signals and outputs the converted signals to the analog signal processing unit 31. The analog signal processing unit 31 is, for example, a drive circuit of the MDs 30a to 30d. The data signals Da to Dd are input to the MDs 30a to 30d via the analog signal processing unit 31.

The input signal detection unit 55 is an example of a second detection unit and detects the wavelength lights Ld, Lb, Lc, and La respectively input to the MDs 30a to 30d. For example, the input signal detection unit 55 detects the output ports P #1 to P #4 of the optical demultiplexer 1 to which the respective wavelength lights Ld, Lb, Lc, and La are output on the basis of monitoring results of monitor circuits Mon #5, Mon #7, Mon #9, and Mon #11. The monitor circuits Mon #5, Mon #7, Mon #9, and Mon #11 notify the input signal detection unit 55 of the monitoring results of power of output light output from the AMZs 1e, 1f, 1h, and 1i to the output ports P #1 to P #4.

The input signal detection unit 55, for example, transmits a detection signal indicating an output port, of the output ports P #1 to P #4, corresponding to the monitor circuits Mon #5, Mon #7, Mon #9, and Mon #11 of which the power that is the monitoring result is equal to or more than a predetermined threshold, to the control unit 56. For example, in a case where the power of the monitoring result of the monitor circuit Mon #5 is equal to or more than the predetermined threshold, the detection signal indicates that the wavelength light Ld is output from the output port P #1, and in a case where the power of the monitoring result of the monitor circuit Mon #11 is equal to or more than the predetermined threshold, the detection signal indicates that the wavelength light La is output from the output port P #4.

The control unit 56 controls the light source 20 so that the wavelength lights La to Ld are sequentially input to the optical demultiplexer 1 one by one. At this time, the control unit 56 specifies the output ports P33, P34, P43, and P44 of the cross connect switch 33 that output the data signals Da to Dd to the MDs 30a to 30d that are connection destinations of the output ports P #1 to P #4 of the optical demultiplexer 1 indicated by the detection signal. Here, the control unit 56, for example, performs specification using information regarding a correspondence relationship between the output port P #1 to P #4 and the output ports P33, P34, P43, and P44 stored in the memory 54 in advance.

The control unit 56 registers a correspondence relationship between the center wavelengths $\lambda a$ to $\lambda d$ of the wavelength lights La to Ld being output, the output ports P #1 to P #4 indicated by the detection signal, and the input ports P11, P12, P21, and P22 and the output ports P33, P34, P43, and P44 of the cross connect switch 33 in a setting table of the cross connect switch 33 in the memory 57. After compensating a difference between optical phases of the AMZs 1a to 1i, the control unit 56 sets each of the switches SW #1 to SW #4 in the cross connect switch 33 according to the setting table. For example, the control unit 56 sets connections between the input ports P11, P12, P21, P22, P31, P32, P41, and P42 and the output ports P13, P14, P23, P24, P33, P34, P43, and P44 of the switches SW #1 to SW #4.

For example, the control unit 56 connects the input port P22 and the output port P23 of the switch SW #2 and connects the input port P32 and the output port P33 of the switch SW #3 so that the wavelength light Ld input from the output port P #1 of the optical demultiplexer 1 to the MD 30a is optically modulated with the data signal Dd input from the digital circuit DPs_d to the MD 30a. Furthermore, the control unit 56 connects the input port P11 and the output port P14 of the switch SW #1 and connects the input port P41 and the output port P44 of the switch SW #4 so that the wavelength light La input from the output port P #4 of the optical demultiplexer 1 to the MD 30d is optically modulated with the data signal Da input from the digital circuit DPs_a to the MD 30d.

In this way, while one of the wavelength lights La to Ld is input to the optical demultiplexer 1, the control unit 56 controls the cross connect switch 33 so that the data signals Da to Dd are input from the digital circuit according to the detected wavelength light of the digital circuits DPs_a to DPs_d to the modulator MDs 30d, 30b, 30c, and 30a to which the wavelength lights La to Ld detected by the input signal detection unit 55 are input. Note that the control unit 56 is an example of a second control unit that controls the light source 20 and the cross connect switch 33.

Therefore, the data signals Dd, db, Dc, and Da are respectively input from the digital circuits DPs_d, DPs_b, DPs_c, and DPs_a corresponding to the wavelength lights Ld, Lb, Lc, and La input from the optical demultiplexer 1 to the respective MDs 30a to 30d. Therefore, the wavelength lights Ld, Lb, Lc, and La are respectively optically modulated on the basis of the data signals Dd, db, Dc, and Da according to the center wavelengths $\lambda a$ to $\lambda d$. Therefore, the optical demultiplexing device 91 can execute appropriate optical modulation processing for each of the center wavelengths $\lambda a$ to $\lambda d$.

[Operation of Control Unit]

Figure 15:
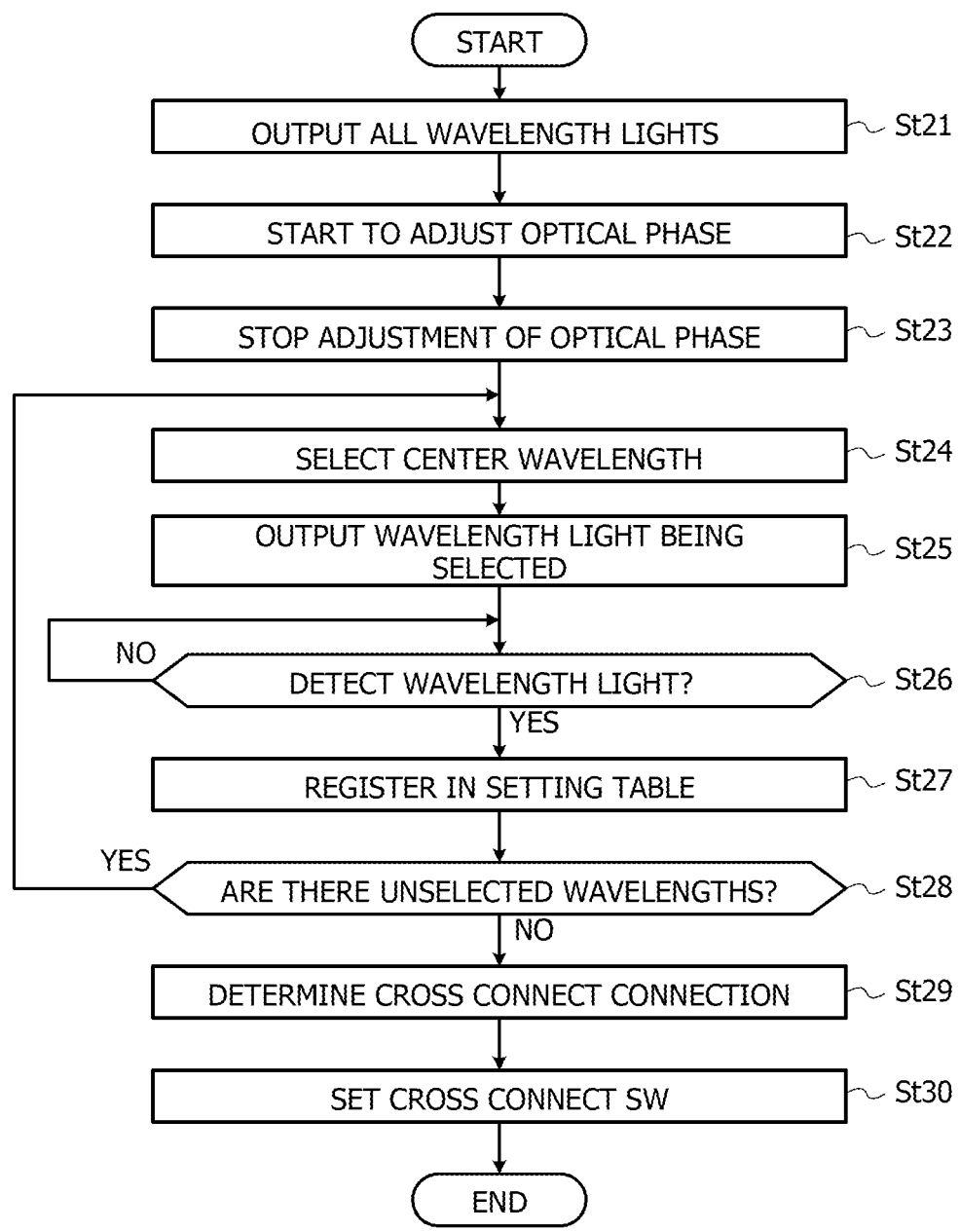
FIG. 15 is a flowchart illustrating an example of an operation of a control unit.

FIG. 15 is a flowchart illustrating an example of an operation of the control unit 56. The control unit 56 performs this operation each time when setting of the cross connect switch 33 is performed.

First, the control unit 56 controls the light emission driving unit 51 so that all of the wavelength lights La to Ld are output from the light source 20 (operation St21). As a result, all the wavelength lights La to Ld are input to the optical demultiplexer 1 at the same time, and the wavelength lights La to Ld are randomly output from the output ports P #1 to P #4.

Next, the control unit 56 makes the compensation circuits Inc #1 to Inc #3 and Dec #1 to Dec #6 start to control phase shifters Hu and Hd so that the phase shifters Hu and Hd of each of the AMZs 1a to 1i start to adjust the optical phase (operation St22). As a result, the difference between the optical phases of the respective wavelength lights La to Ld is compensated.

After the compensation of the difference between the optical phases, the control unit 56 makes the compensation circuits Inc #1 to Inc #3 and Dec #1 to Dec #6 stop the control of the phase shifters Hu and Hd so that the phase shifters Hu and Hd of the AMZs 1a to 1i stop the adjustment of the optical phase (operation St23). Therefore, before the wavelength lights La to Ld are output one by one, the output ports P #1 to P #4 of the optical demultiplexer 1 are associated with the respective wavelength lights La to Ld.

Figure 16:
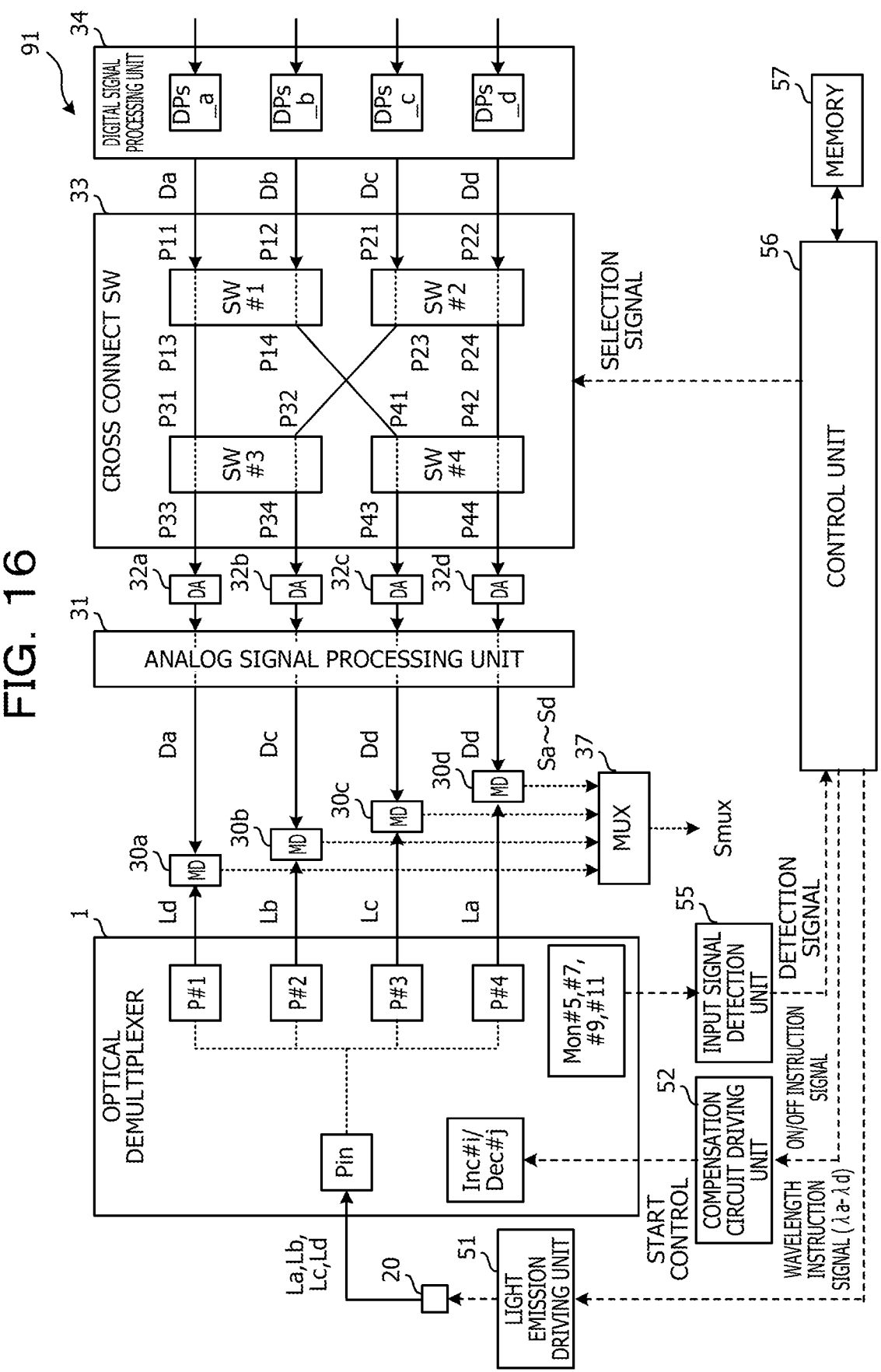
FIG. 16 is a diagram illustrating an example of a state where all wavelength lights are input to an optical demultiplexer.

FIG. 16 is a diagram illustrating an example of a state where all the wavelength lights La to Ld are input to the optical demultiplexer 1. As an example, the wavelength lights La to Ld are demultiplexed by the optical demultiplexer 1, the wavelength light Ld is output from the output port P #1, and the wavelength light Lb is output from the output port P #2. Furthermore, the wavelength light Lc is output from the output port P #3, and the wavelength light La is output from the output port P #4. At this time, the compensation circuits Inc #1 to Inc #3 and Dec #1 to Dec #6 control the phase shifters Hu and Hd. Therefore, in the optical demultiplexer 1, the difference between the optical phases of the wavelength lights La to Ld is compensated by the phase shifters Hu and Hd.

Referring to FIG. 15 again, after the operation in operation St23, the control unit 56 selects one wavelength from among the center wavelengths $\lambda a$ to $\lambda d$ with the wavelength lights La to Ld (operation St25). Note that a selection order of the center wavelengths $\lambda a$ to $\lambda d$ is not limited. Next, the control unit 56 controls the light emission driving unit 51 so as to output only the wavelength lights La to Ld with the center wavelengths λa to λd being selected from the light source 20 (operation St26). As a result, only the wavelength lights La to Ld with the center wavelengths λa to λd being selected are input to the optical demultiplexer 1, and the wavelength lights La to Ld are output from an output port, corresponded in advance, of the output ports P #1 to P #4.

Next, the control unit 56 determines whether or not the wavelength lights La to Ld are detected by the input signal detection unit 55 (operation St26). By receiving the detection signal from the input signal detection unit 55, the control unit 56 determines whether or not the wavelength lights La to Ld are detected. In a case where the wavelength lights La to Ld are not detected (No in operation St26), the processing in operation St26 is executed again.

Furthermore, in a case where the wavelength lights La to Ld are detected (Yes in operation St26), the control unit 56 registers the output ports P #1 to P #4 of the wavelength lights La to Ld and the output ports P33, P34, P43, and P44 of the cross connect switch 33 corresponding to the output ports P #1 to P #4 in the setting table in the memory 54 on the basis of the detection signal (operation St27).

Next, the control unit 56 determines whether or not there are unselected center wavelengths λa to λd (operation St28). In a case where there are unselected center wavelengths λa to λd (No in operation St28), the control unit 56 selects the other center wavelengths λa to λd (operation St24) and performs the operation in and subsequent to operation St25 again.

Figure 17:
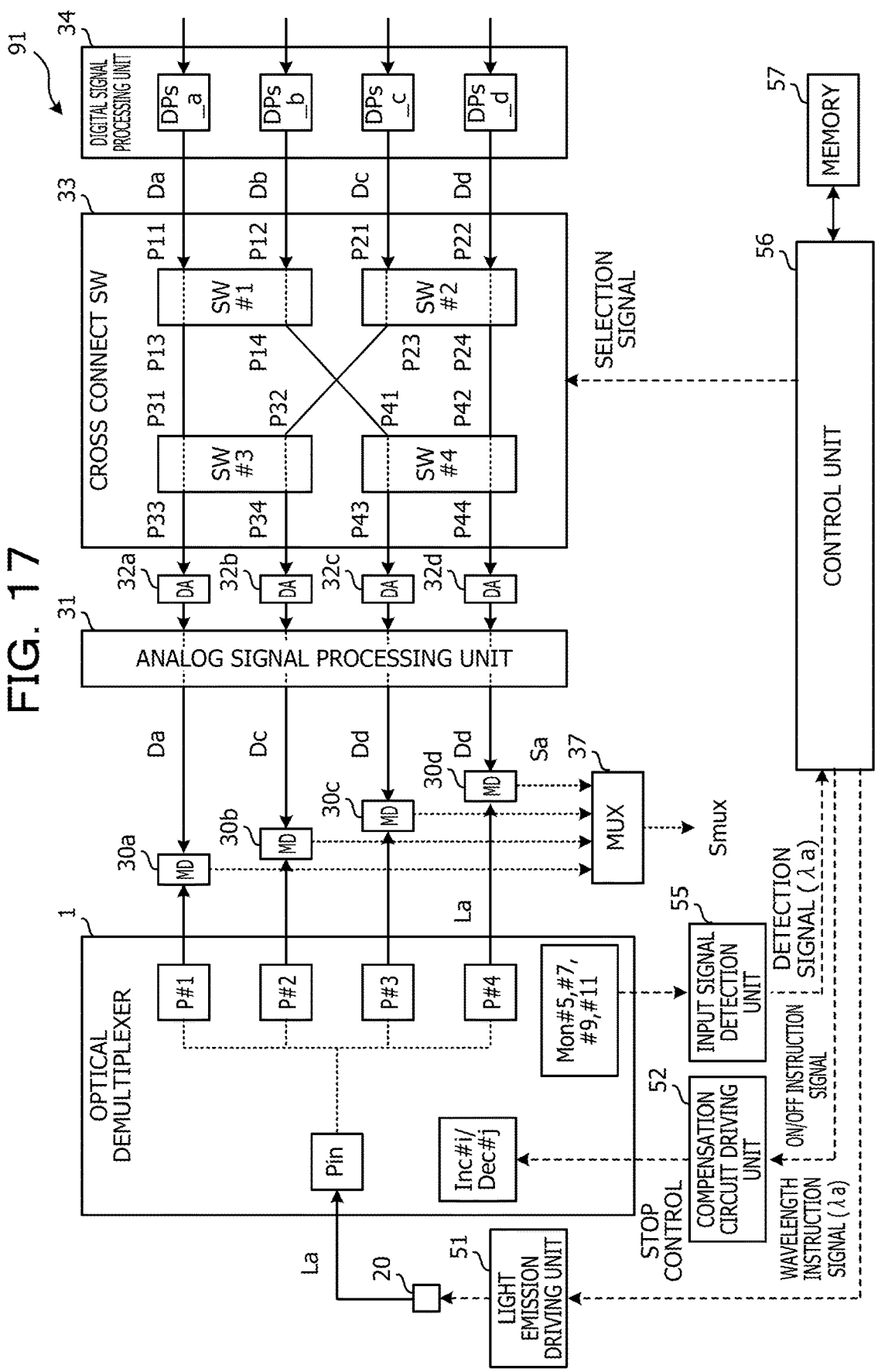
FIG. 17 is a diagram illustrating an example of a state where a wavelength light with a center wavelength being selected is input to the optical demultiplexer.

FIG. 17 is a diagram illustrating an example of a state where the wavelength light La with the center wavelength λa being selected is input to the optical demultiplexer 1. The control unit 56 instructs to output the wavelength light La by transmitting a wavelength instruction signal indicating the center wavelength λa to the light emission driving unit 51. As a result, the light source 20 outputs only the wavelength light La. The wavelength light La is input from the output port P #4 of the optical demultiplexer 1 associated at the time when the difference between the optical phases is compensated to the MD 30d.

At this time, because cross connect connection of the cross connect switch 33 is in an initial setting state, the data signal Dd is input from the digital circuit DPs_d, which does not correspond to the wavelength light La, to the MD 30d. Therefore, the wavelength light La is optically modulated with the data signal Dd that does not correspond to the center wavelength λa.

FIG. 18 is a diagram illustrating an example of the setting table in the memory 57. In the setting table, the center wavelengths λa to λd of the wavelength lights La to Ld, output port IDs (P #1 to P #4) of the optical demultiplexer 1, input port IDs (P11, P12, P21, and P22) and output port IDs (P33, P34, P43, and P44) of the cross connect switch 25 are registered.

The center wavelengths λa to λd and the input port IDs of the cross connect switch 33 are registered in the setting table in advance. Because the input ports P11, P12, P21, and P22 are respectively connected to the digital circuits DPs_a to DPs_d in a one-to-one relationship, the center wavelengths λa to λd and the input ports P11, P12, P21, and P22 also correspond in a one-to-one relationship.

The control unit 50 specifies the output ports P #1 to P #4 of the optical demultiplexer 1 that have output the wavelength lights La to Ld from the detection signal. The output ports P #1 to P #4 are respectively connected to the MDs 30a to 30d, and the output ports P33, P34, P43, and P44 of the cross connect switch 33 are respectively connected to the MDs 30a to 30d. Therefore, the output ports P #1 to P #4 and the output ports P33, P34, P43, and P44 correspond in a one-to-one relationship.

Therefore, the control unit 56 can specify the output ports P33, P34, P43, and P44 of the cross connect switch 33 corresponding to the output ports P #1 to P #4 indicated by the detection signal from information regarding the correspondence relationship described above stored in the memory 57 in advance, for example.

For example, in a case of selecting the center wavelength λa in operation St24, the control unit 56 receives the detection signal indicating the wavelength light La from the output port P #4. Therefore, the control unit 56 registers P #4 in the setting table as the output port ID of the optical demultiplexer 1 corresponding to the center wavelength λa.

Moreover, the control unit 56 specifies the output port P44 of the cross connect switch 33 corresponding to the output port P #4 and registers P44 that is the output port ID in the setting table. Note that, for the other center wavelengths λb to λd, the output port ID of the cross connect switch 25 of the optical demultiplexer 1 is specified with the similar method.

Referring to FIG. 15 again, the control unit 56 determines cross connect connection of the cross connect switch 33 on the basis of the setting table (operation St29) and sets the cross connect connection to the cross connect switch 33 according to a selection signal indicating the connection relationship (operation St30).

For example, the control unit 56 performs connection setting between the output port P44 and the input port P11 of the data signal Da on the switches SW #1 and SW #4 so that the data signal Da is output from the output port P44 of the cross connect switch 33. Furthermore, the control unit 56 performs connection setting between the output port P33 and the input port P22 of the data signal Dd on the switches SW #2 and SW #3 so that the data signal Dd is output from the output port P33 of the cross connect switch 33.

As a result, the data signals Da to Dd are respectively input to the MDs 30a to 30d that optically modulate the wavelength lights La to Ld corresponding to the data signals Da to Dd. Therefore, appropriate optical modulation processing according to the center wavelengths λa to λd is executed on the wavelength lights La to Ld.

Modification of Second Embodiment

Figure 19:
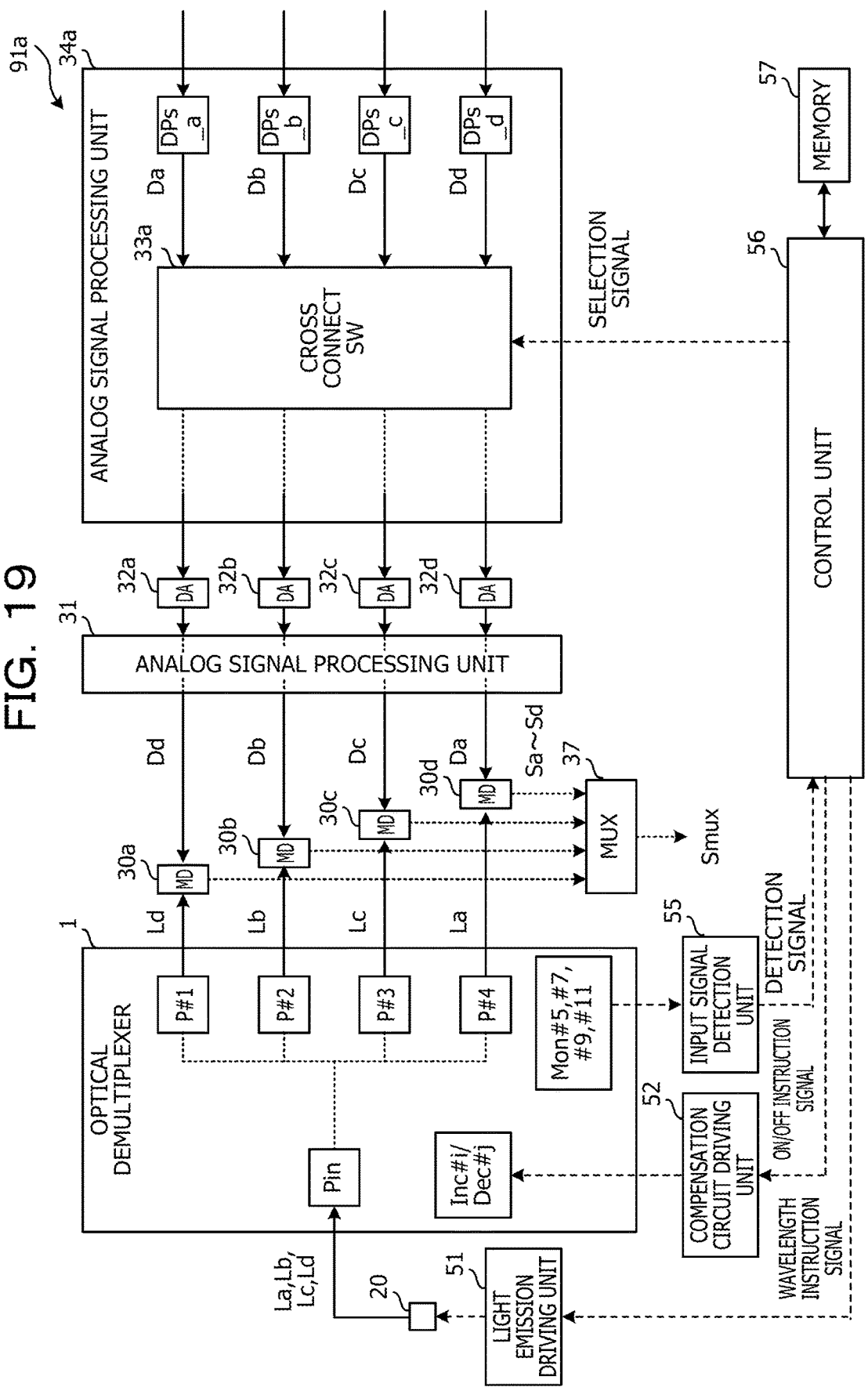
FIG. 19 is a configuration diagram illustrating an example of an optical demultiplexing device that includes a digital signal processing unit including a cross connect switch.

FIG. 19 is a configuration diagram illustrating an example of an optical demultiplexing device 91a that includes a digital signal processing unit 34a including a cross connect switch 33a. In FIG. 19, the component same as that in FIG. 14 is denoted by the same reference numeral, and description thereof will be omitted.

The digital signal processing unit 34a is provided in the optical demultiplexing device 91a instead of the digital signal processing unit 34 and includes the cross connect switch 33a that is similar to the cross connect switch 33. Furthermore, the digital signal processing unit 34a includes digital circuits DPr_a to DPr_d. The cross connect switch 33a is connected to post stages of the digital circuits DPr_a to DPr_d.

Also in this example, by setting the cross connect switch 33a with a method as described above by a control unit 56, MDs 30d, 30b, 30c, and 30a can optically modulate wavelength lights La to Ld with data signals Da to Dd input from the digital circuits DPr_a to DPr_d according to center wavelengths λa to λd.

Figure 20:
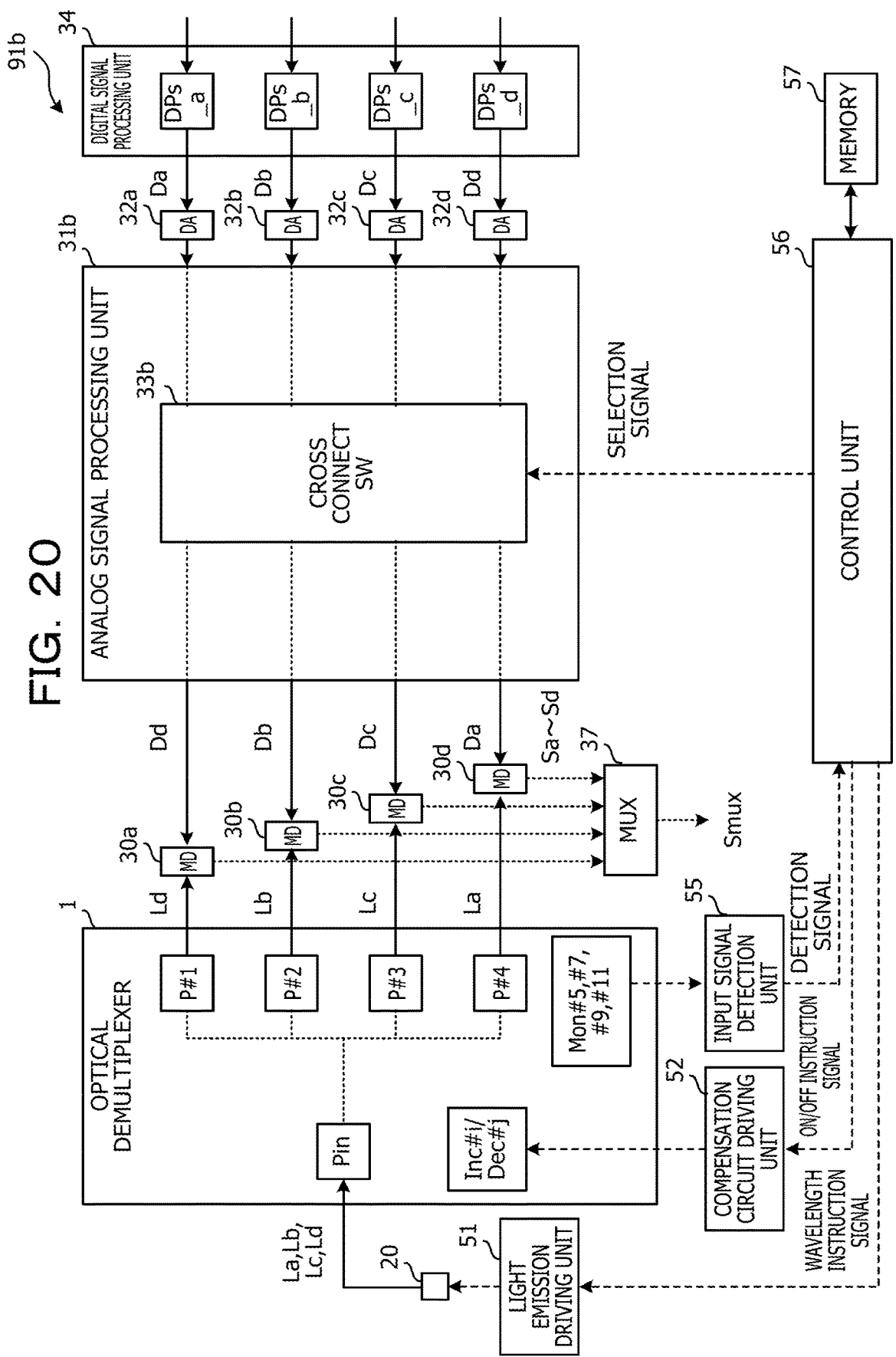
FIG. 20 is a configuration diagram illustrating an example of an optical demultiplexing device that includes an analog signal processing unit including a cross connect switch.

FIG. 20 is a configuration diagram illustrating an example of an optical demultiplexing device 91b that includes an analog signal processing unit 31b including a cross connect switch 33b. In FIG. 20, the component same as that in FIG. 14 is denoted by the same reference numeral, and description thereof will be omitted.

The analog signal processing unit 31b is provided in the optical demultiplexing device 91b instead of the analog signal processing unit 31 and includes the cross connect switch 33b that is similar to the cross connect switch 33.

Also in this example, by setting the cross connect switch 33b with a method as described above by the control unit 56, the MDs 30d, 30b, 30c, and 30a can optically modulate the wavelength lights La to Ld with the data signals Da to Dd input from the digital circuits DPr_a to DPr_d according to the center wavelengths λa to λd.

Third Embodiment

Figure 21:
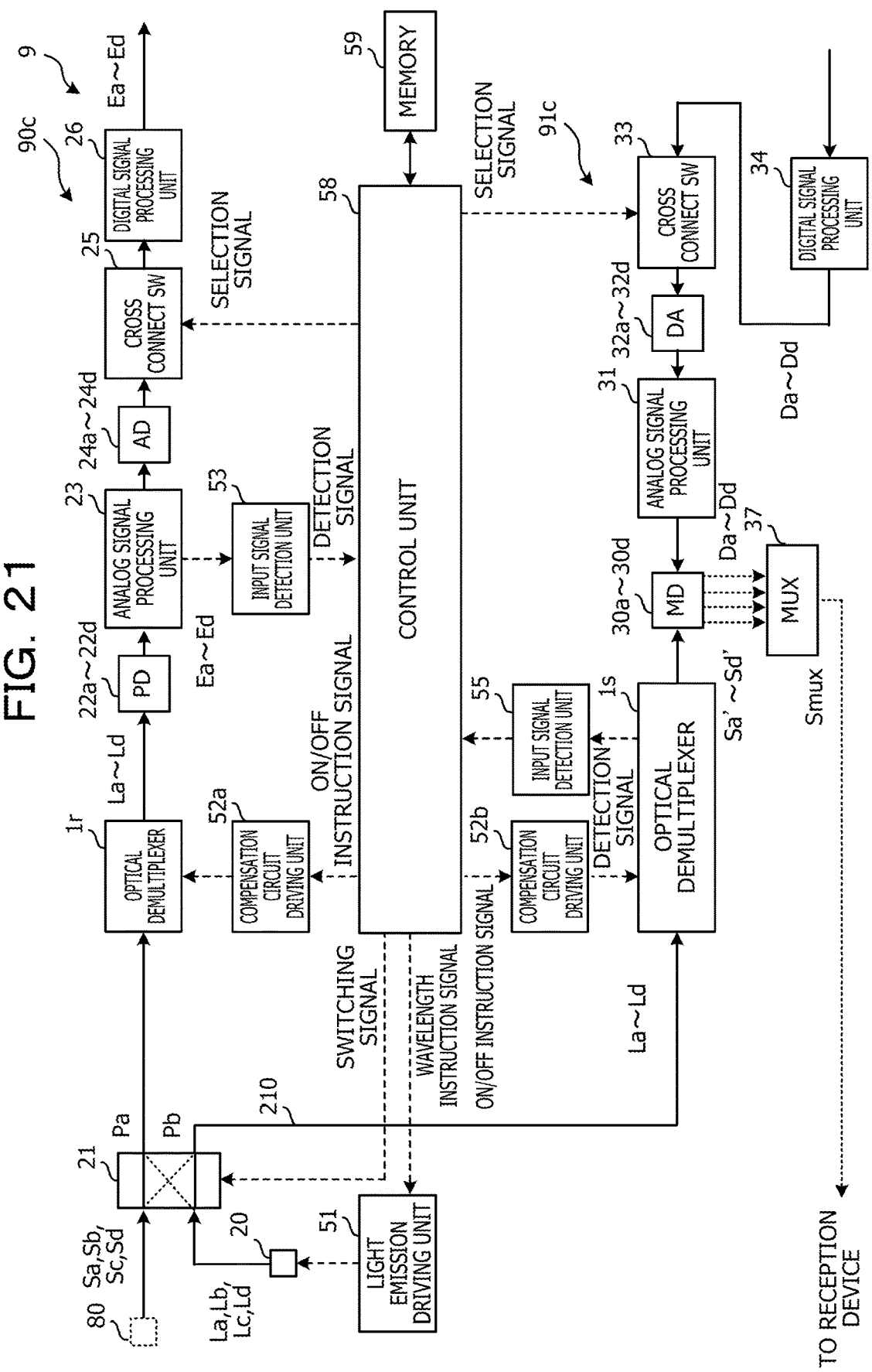
FIG. 21 is a configuration diagram illustrating an example of a transmission device.

FIG. 21 is a configuration diagram illustrating an example of a transmission device 9. In FIG. 21, the same components as those in FIGS. 3 and 14 are denoted by the same reference numerals, and description thereof will be omitted.

The transmission device 9 includes the configurations of the optical demultiplexing devices 90 and 91 described above. Note that the transmission device 9 may include the configurations of the optical demultiplexing devices 90a and 90b in the modification instead of the optical demultiplexing device 90 and may further include the configurations of the optical demultiplexing devices 91a and 91b in the modification instead of the optical demultiplexing device 91.

The transmission device 9 includes a control unit 58, a memory 59, a transmission unit 91c that transmits a wavelength multiplexing signal light, and a reception unit 90c that receives another wavelength multiplexing signal light. The transmission unit 91c has a function similar to that of the optical demultiplexing device 91, and the reception unit 90c has a function similar to that of the optical demultiplexing device 90.

The reception unit 90c includes a light source 20, an optical switch 21, an optical demultiplexer 1, PDs 22a to 22d, an analog signal processing unit 23, ADs 24a to 24d, a cross connect switch 25, a digital signal processing unit 26, a light emission driving unit 51, a compensation circuit driving unit 52a, and an input signal detection unit 53. An optical demultiplexer 1r includes AMZs 1a to 1i similarly to the optical demultiplexer 1. The AMZs 1a to 1i of the optical demultiplexer 1r are connected to each other so that wavelength lights La and Lb are respectively output to the PDs 22a to 22d different from each other. Note that the AMZs 1a to 1i of the optical demultiplexer 1r are examples of a plurality of first asymmetric Mach-Zehnder interferometers. The compensation circuit driving unit 52a has a function similar to that of the compensation circuit driving unit 52.

The transmission unit 91c includes an optical demultiplexer is, MDs 30a to 30d, an analog signal processing unit 31, DAs 32a to 32d, a cross connect switch 33, a digital signal processing unit 34, a multiplexing unit 37, a compensation circuit driving unit 52b, and an input signal detection unit 55. The optical demultiplexer is includes AMZs 1a to 1i similarly to the optical demultiplexer 1. The AMZs 1a to 1i of the optical demultiplexer is are connected to each other so that the wavelength lights La to Ld are demultiplexed and respectively output to the MDs 30a to 30d different from each other. Note that the AMZs 1a to 1i of the optical demultiplexer is are examples of a plurality of second asymmetric Mach-Zehnder interferometers. The compensation circuit driving unit 52b has a function similar to that of the compensation circuit driving unit 52.

The transmission unit 91c and the reception unit 90c share the light source 20 of the wavelength lights La to Ld. Therefore, one output port Pa of the optical switch 21 is optically connected to the optical demultiplexer 1r of the reception unit 90c, and another output port Pb is connected to the optical demultiplexer 1s of the transmission unit 91c as indicated by a reference 210.

The optical switch 21 switches the output ports Pa and Pb of the wavelength lights La to Ld from the light source 20 according to a switching signal from the control unit 58. In a case where the wavelength lights La to Ld are input to the optical demultiplexer 1s of the transmission unit 91c, the transmission unit 91c uses the wavelength lights La to Ld as transmission lights of data signals Da to Dd. In this case, after setting the cross connect switch 33 according to the detection of the wavelength lights La to Ld as described above, the MDs 30a to 30d optically modulate the wavelength lights La to Ld on the basis of the data signals Da to Dd so as to generate each of signal lights Sa' to Sd'. The signal lights Sa' to Sd' are multiplexed to a wavelength multiplexing signal light Smux by the multiplexing unit 37 and are transmitted to a reception device.

Furthermore, in a case where the wavelength lights La to Ld are input to the optical demultiplexer 1r of the reception unit 90c, the cross connect switch 25 is set on the basis of a detection result of electrical signals Ea to Ed converted from the wavelength lights La to Ld as described above.

The control unit 58 is implemented by a circuit or the like including a processor such as a CPU or the like. The control unit 58 is an example of a third control unit that controls the light source 20, the optical switch 21, and the cross connect switches 25 and 33. Furthermore, the memory 57 stores the setting tables illustrated in FIGS. 8 and 18.

The control unit 58 has a reception setting mode for setting the cross connect switch 25 of the reception unit 90c with a method similar to the control unit 50 and a transmission setting mode for setting the cross connect switch 33 of the transmission unit 91c with a method similar to the control unit 56. Note that the reception setting mode is an example of a first control mode for controlling the cross connect switch 25, and the transmission setting mode is an example of a second control mode for controlling the cross connect switch 33. The control unit 58 can switch an operation mode to one of the reception setting mode and the transmission setting mode by a network monitoring control device (not illustrated), for example.

Figure 22:
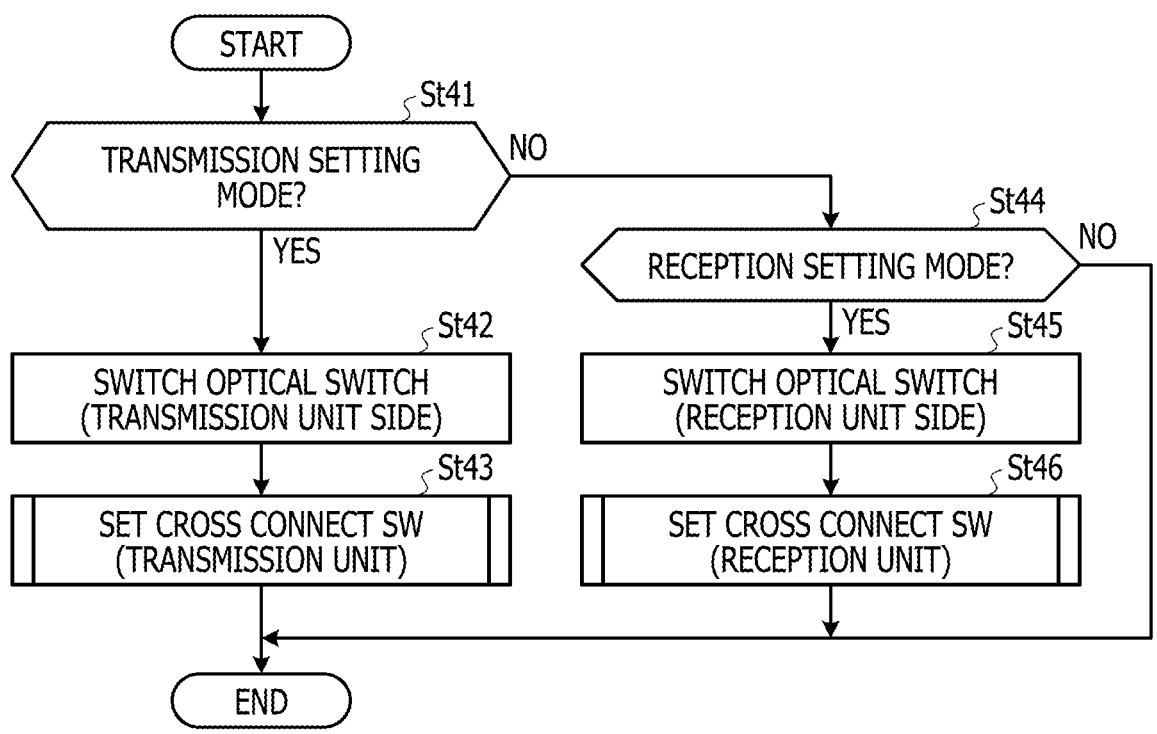
FIG. 22 is a flowchart illustrating an example of an operation of a control unit.

FIG. 22 is a flowchart illustrating an example of an operation of the control unit 56. This operation is performed, for example, at the time when the transmission device 9 is activated.

The control unit 56 determines whether or not the operation mode is the transmission setting mode (operation St41). In a case where the operation mode is the transmission setting mode (Yes in operation St41), the control unit 56 performs control for switching the optical switch 21 so that the wavelength lights La to Ld are input to the optical demultiplexer 1s of the transmission unit 91c (operation St42). Next, the control unit 56 sets the cross connect switch 33 of the transmission unit 91c with a method similar to that in FIG. 15 (operation St43).

Furthermore, in a case where the operation mode is not the transmission setting mode (No in operation St41), the control unit 56 determines whether or not the operation mode is the reception setting mode (operation St44). In a case where the operation mode is not the reception setting mode (No in operation St44), the control unit 56 ends the operation.

Furthermore, in a case where the operation mode is the reception setting mode (No in operation St44), the control unit 56 performs control for switching the optical switch 21 so that the wavelength lights La to Ld are input to the optical demultiplexer 1r of the reception unit 90c (operation St45). Next, the control unit 56 sets the cross connect switch 25 of the reception unit 90c with a method similar to that in FIG. 5 (operation St46).

Therefore, the transmission device 9 can execute appropriate signal processing on the wavelength lights La to Ld similarly to the optical demultiplexing devices 90 and 91.

Another Example of Cross Connect Switch

Figure 23:
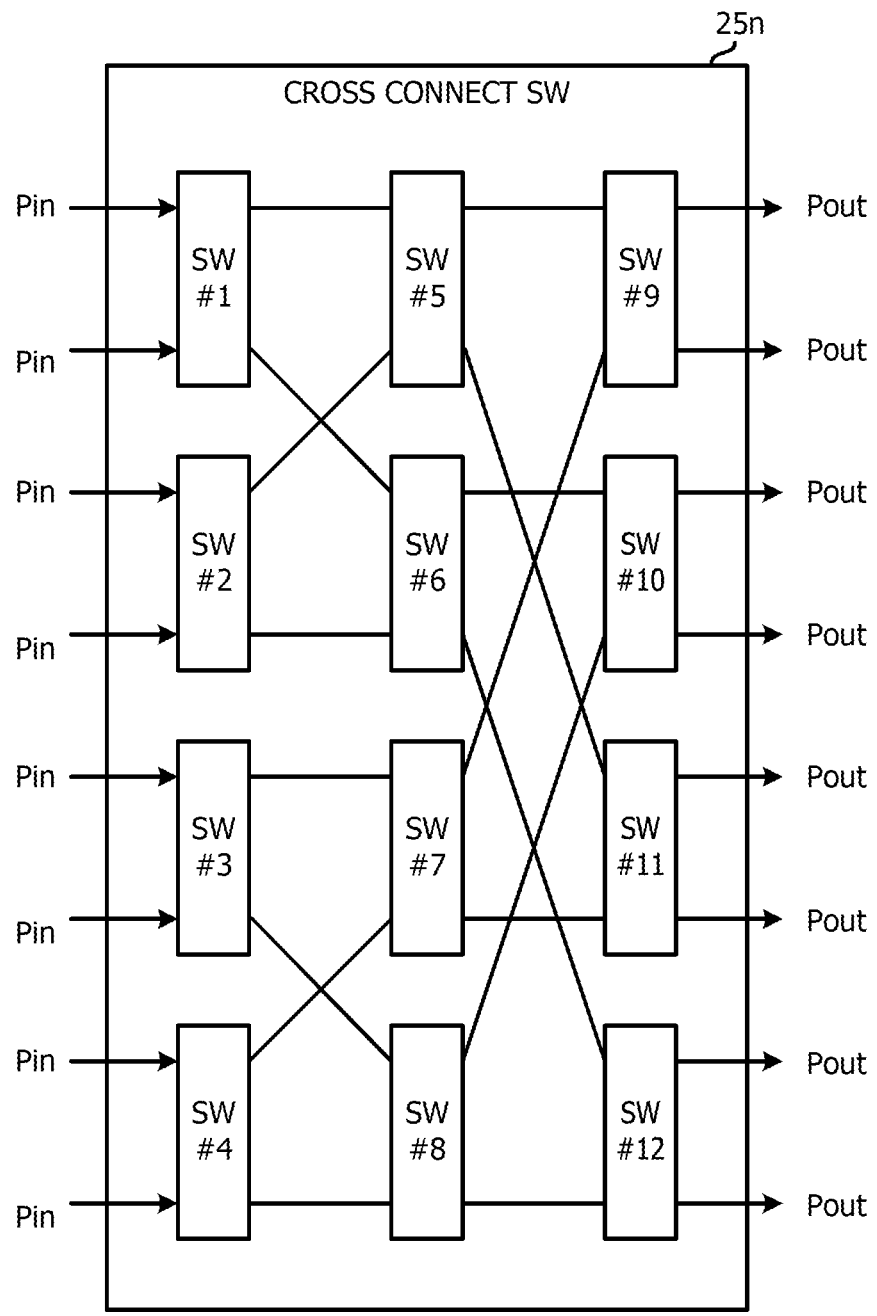
FIG. 23 is a configuration diagram illustrating an example of a cross connect switch used in a case where the number of wavelengths of a wavelength light of a light source is eight.

FIG. 23 is a configuration diagram illustrating an example of a cross connect switch 25n used in a case where the number of wavelengths of a wavelength light of the light source 20 is eight. The cross connect switch 25n includes 2×2 switches SW #1 to SW #12 connected in multiple stages. Each of the switches SW #1 to SW #12 is, for example, a Banyan switch.

The cross connect switch 25n has eight input ports Pin and output ports Pout as many as the number of wavelengths. In a case where the cross connect switch 25n is used for the optical demultiplexing device 90, eight electrical signals are input and output, the optical demultiplexing device 90 selects an output destination of each electrical signal. Furthermore, in a case where the cross connect switch 25n is used for the optical demultiplexing device 91, eight data signals are input and output, and the cross connect switch 25n selects an input source of the data signal to each of the MDs 30a to 30d. As a result, the optical demultiplexing devices 90 and 91 can cope with the eight wavelength lights. Note that, in a case where the number of wavelengths is assumed as N, the number of stages of the switches SW #1 to SW #12 in the cross connect switch 25n is $\log_2 N$.

[Comparison of Power Consumption]

Figure 24:
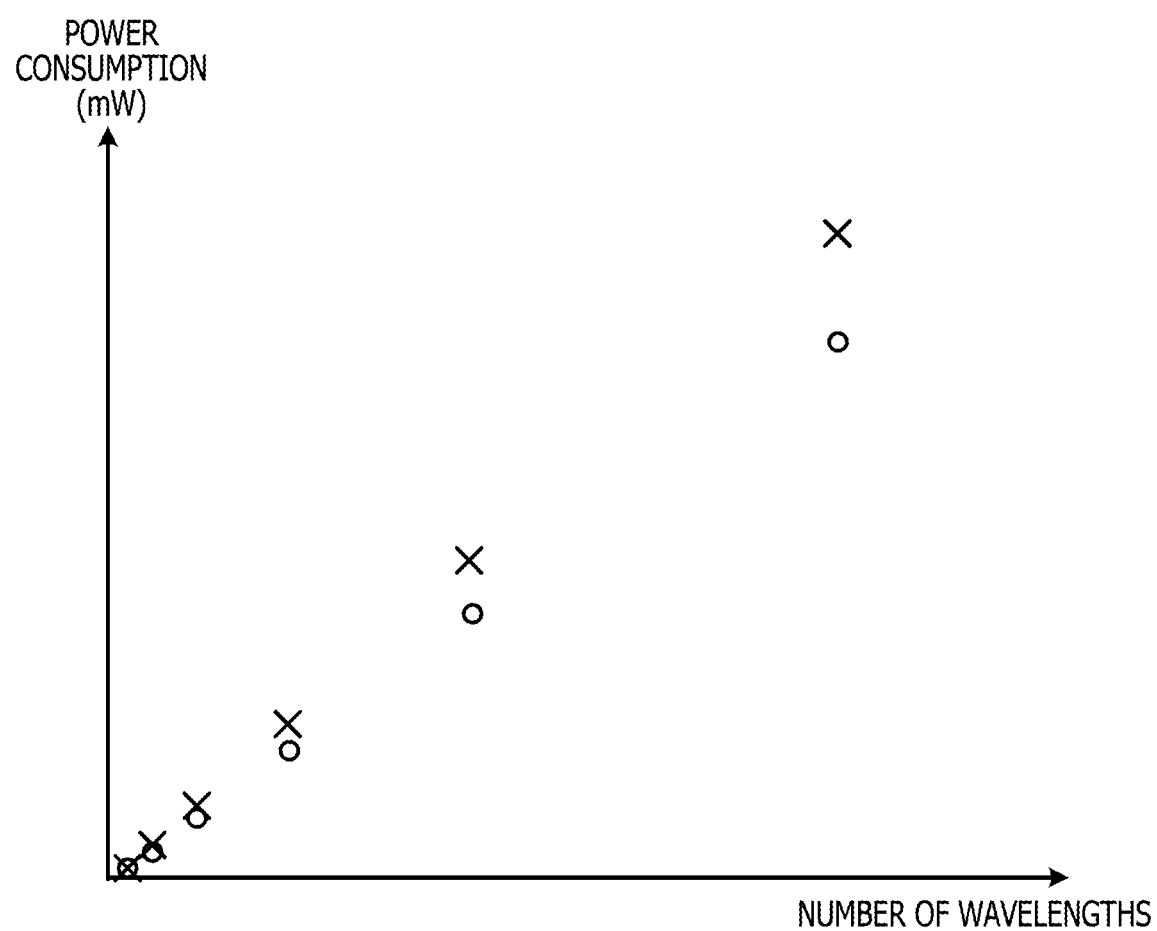
FIG. 24 is a diagram illustrating an example of a change in power consumption of a phase shifter for the number of wavelengths to be demultiplexed of the optical demultiplexer.

FIG. 24 is a diagram illustrating an example of a change in power consumption of phase shifters Hu and Hd for the number of wavelengths to be demultiplexed of the optical demultiplexer 1. A circle indicates a total of power consumption of the phase shifters Hu and Hd of each of the AMZs 1a to 1i of the optical demultiplexer 1 when being used for the optical demultiplexing devices 90 and 91. A cross mark indicates a total of power consumption of the phase shifters Hu and Hd of each of the AMZs 1a to 1i of the optical demultiplexer 1 when being used for the method illustrated in FIG. 2 (hereinafter, referred to as comparison method).

In the comparison method, the output ports P #1 to P #4 are fixedly allocated to the wavelength lights La to Ld. Therefore, each of the compensation circuits Inc #1 to Inc #3 and Dec #1 to Dec #12 controls the phase shifters Hu and Hd so that, along the route K for each of the wavelength lights La to Ld, a peak of a transmission band matches each of the center wavelengths λa to λd of the corresponding one of the wavelength lights La to Ld.

On the other hand, in the optical demultiplexing devices 90 and 91, the output ports P #1 to P #4 are freely allocated to the wavelength lights La to Ld. Therefore, each of the compensation circuits Inc #1 to Inc #3 and Dec #1 to Dec #12 can control the phase shifters Hu and Hd so that the peak of the transmission band matches the center wavelengths λa to λd of the wavelength lights La to Ld that minimize the power consumption. Therefore, in a case of the optical demultiplexing devices 90 and 91, the power consumption is reduced as compared with the comparison method.

Fourth Embodiment

Figure 25:
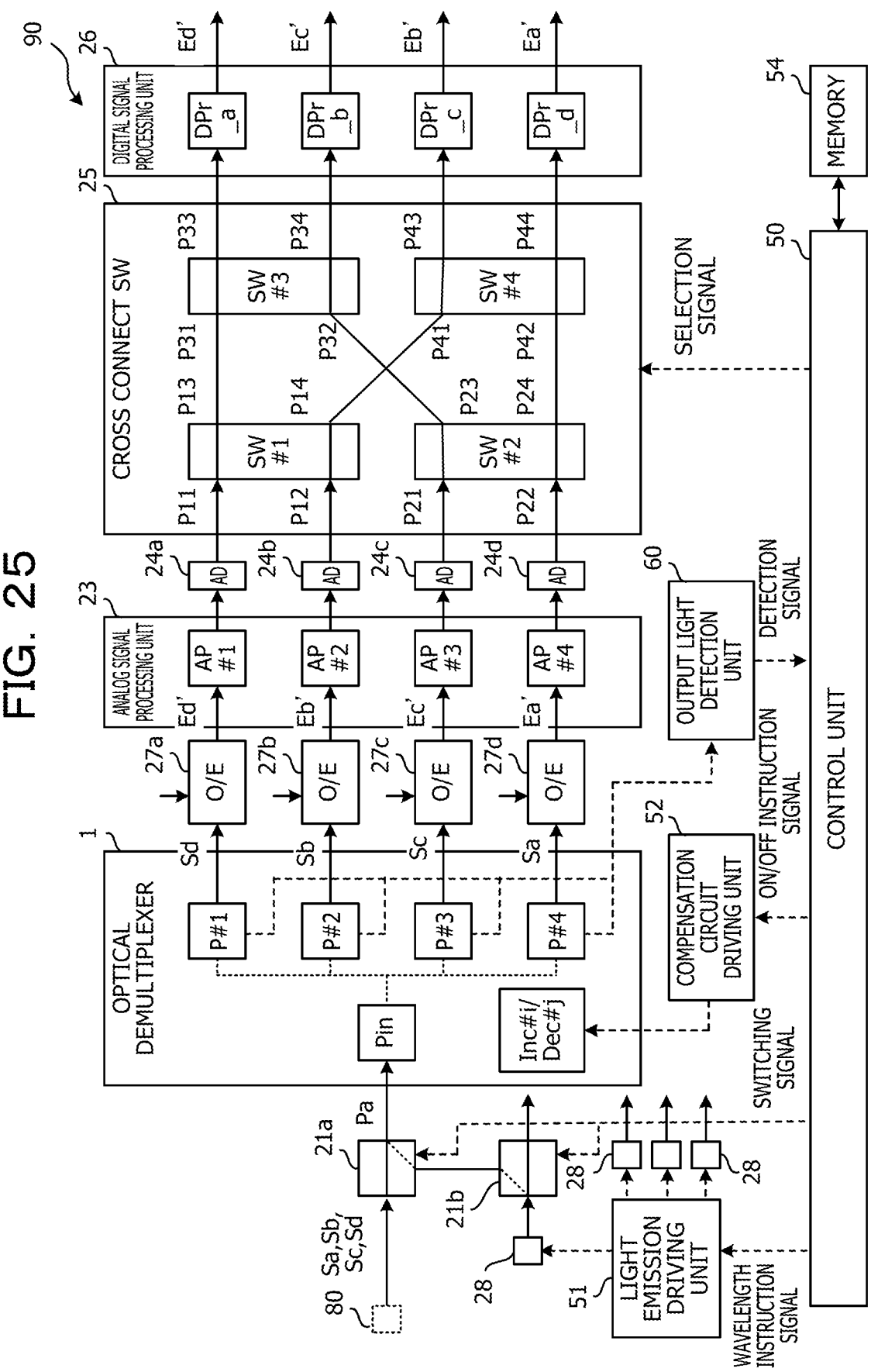
FIG. 25 is a configuration diagram illustrating an optical demultiplexing device according to a fourth embodiment.

FIG. 25 is a configuration diagram illustrating an optical demultiplexing device 90 according to a fourth embodiment. Note that, in FIG. 25, a component same as that in the optical demultiplexing device 90 according to the first embodiment described with reference to FIG. 3 is denoted by the same reference numeral, and detailed description thereof will be basically omitted.

The optical demultiplexing device 90 according to the fourth embodiment includes a plurality of wavelength variable light sources 28, a first optical switch 21a, a second optical switch 21b, an optical demultiplexer 1, and optical-electrical converters (O/E) 27a to 27d. Each of the O/Es 27a to 27d includes a 90-degree optical hybrid circuit and a balanced photodiode (BPD). Furthermore, the optical demultiplexing device 90 includes an analog signal processing unit 23, ADs 24a to 24d, a cross connect switch 25, and a digital signal processing unit 26. Moreover, the optical demultiplexing device 90 includes a control unit 50, a light emission driving unit 51, a compensation circuit driving unit 52, a memory 54, and an output light detection unit 60. The light emission driving unit 51, the compensation circuit driving unit 52, the output light detection unit 60, the analog signal processing unit 23, and the digital signal processing unit 26 are implemented, for example, by a FPGA, an ASIC, or the like. The control unit 50 is implemented by a circuit or the like including a processor such as a CPU or the like. Note that the optical demultiplexer 1 according to the fourth embodiment is an example of a third demultiplexing unit.

The first optical switch 21a includes two input ports and one output port Pa. A wavelength multiplexing signal light of a plurality of signal lights Sa to Sd is input from a transmitting device 80 to the one input port, and one of the wavelength lights La to Ld is selectively input from the second optical switch 21b to the another input port. The second optical switch 21b includes one input port and two output ports. One of the wavelength lights La to Ld is selectively input from one of the plurality of wavelength variable light sources 28 to the input port.

Each of the plurality of wavelength variable light sources 28 is an example of a third light source that switches and outputs one of the plurality of wavelength lights La to Ld of which a wavelength spacing is constant. One of the plurality of wavelength variable light sources 28 is optically connected to the input port of the second optical switch 21b. The remaining three wavelength variable light sources 28 except the one of the plurality of wavelength variable light sources 28 are respectively optically connected to the 90-degree optical hybrid circuits of the O/Es 27b to 27d. The light emission driving unit 51 drives the plurality of wavelength variable light sources 28 in response to a wavelength instruction signal input from the control unit 50. Each of the plurality of wavelength variable light sources 28 outputs each of the wavelength lights La to Ld with the center wavelengths λa to λd instructed by the wavelength instruction signal. Note that the control unit 50 is an example of a third control unit that controls the plurality of wavelength variable light sources 28 and the cross connect switch 25.

The first optical switch 21a switches an input source of input light to either one of the second optical switch 21b and the transmitting device 80 according to a switching signal input from the control unit 50. For example, the first optical switch 21a is an example of a selection unit that selects input light from one of the wavelength lights La to Ld and the wavelength multiplexing signal light having the center wavelengths λa to λd common to the wavelength lights La to Ld. The output port Pa is optically connected to the input port Pin of the optical demultiplexer 1. The second optical switch 21b switches the output port that outputs the wavelength lights La to Ld according to the switching signal input from the control unit 50. One of the output ports is optically connected to the input port of the first optical switch 21a. Another one of the output ports is optically connected to the 90-degree optical hybrid circuit of the O/E 27a. In a case where setting of the cross connect switch 25 is performed, the control unit 50 switches the first optical switch 21a and the second optical switch 21b so that the wavelength lights La to Ld are output from the output port Pa.

The wavelength lights La to Ld are input from one of the plurality of wavelength variable light sources 28 to the optical demultiplexer 1 and demultiplexed for each wavelength. The AMZs 1a to 1i of the optical demultiplexer 1 are connected to each other so that the wavelength lights La to Ld are respectively output to the 90-degree optical hybrid circuits of the O/E 27a to 27d different from each other.

Prior of the setting of the cross connect switch 25, the control unit 50 controls the first optical switch 21a to output the wavelength multiplexing signal light to the optical demultiplexer 1 and further starts operations of all compensation circuits Inc #i and Dec #j. An optical phase of the wavelength multiplexing signal light input to the optical demultiplexer 1 is compensated by the compensation circuits Inc #i and Dec #j, demultiplexed into the signal lights Sa to Sd, and are randomly output from output ports P #1 to P #4. By inputting the wavelength multiplexing signal light to the optical demultiplexer 1 in advance, it is possible to suppress noise when the wavelength lights La to Ld to be output as output light from the output ports P #1 to P #4 later are detected.

In this example, it is assumed that the signal light Sd be output from the output port P #1, the signal light Sb be output from the output port P #2, the signal light Sc be output from the output port P #3, and the signal light Sa be output from the output port P #4. After the respective signal lights Sa to Sd are output from the output ports P #1 to P #4, the control unit 50 stops the operations of all the compensation circuits Inc #i and Dec #j and makes one of the plurality of wavelength variable light sources 28 switch each of the wavelength lights La to Ld one by one and output the wavelength lights La to Ld to the optical demultiplexer 1.

Figure 26:
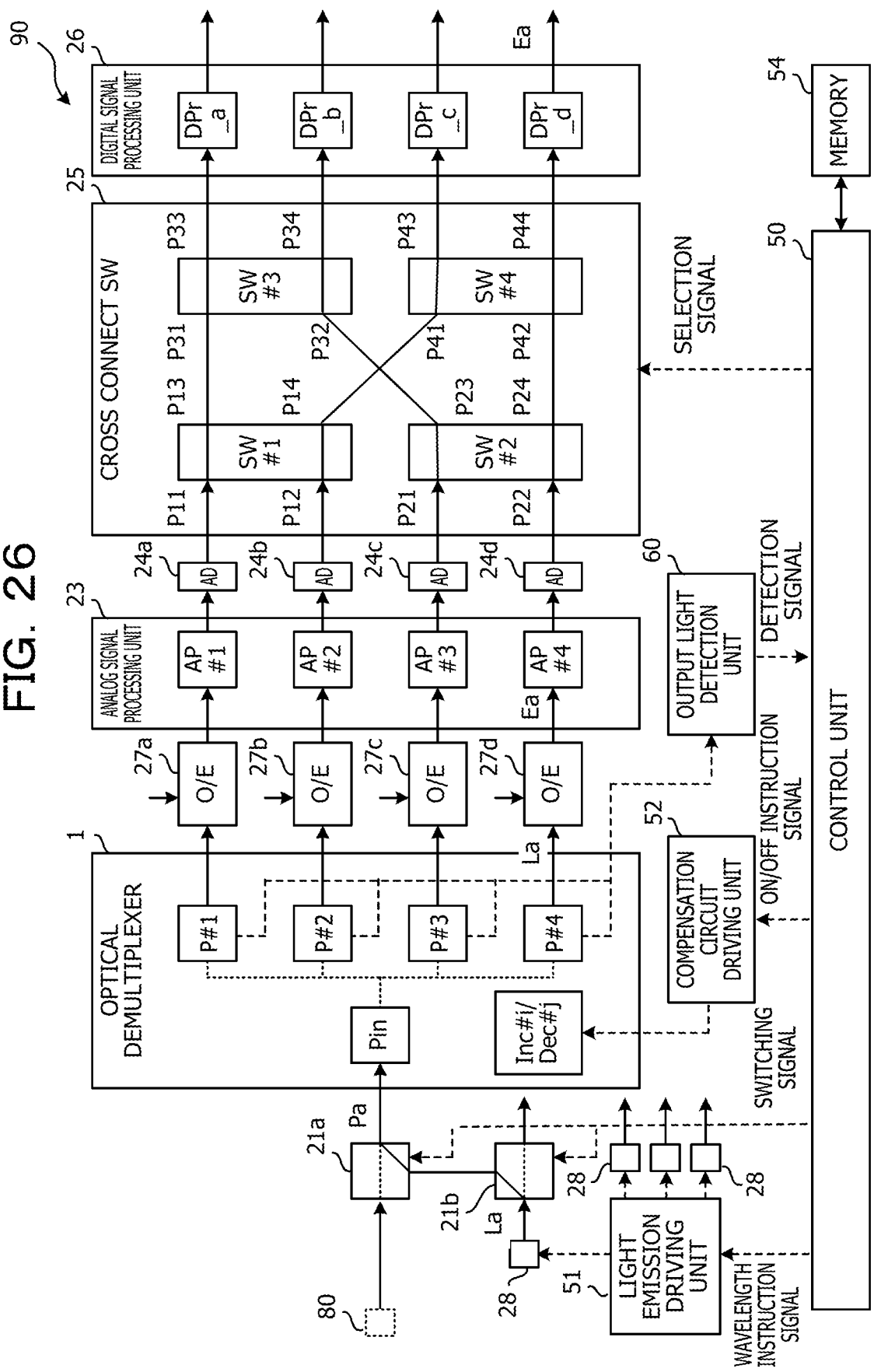
FIG. 26 is a diagram illustrating an example of a state where a wavelength light with a center wavelength being selected is input to the optical demultiplexer.
Figure 27:
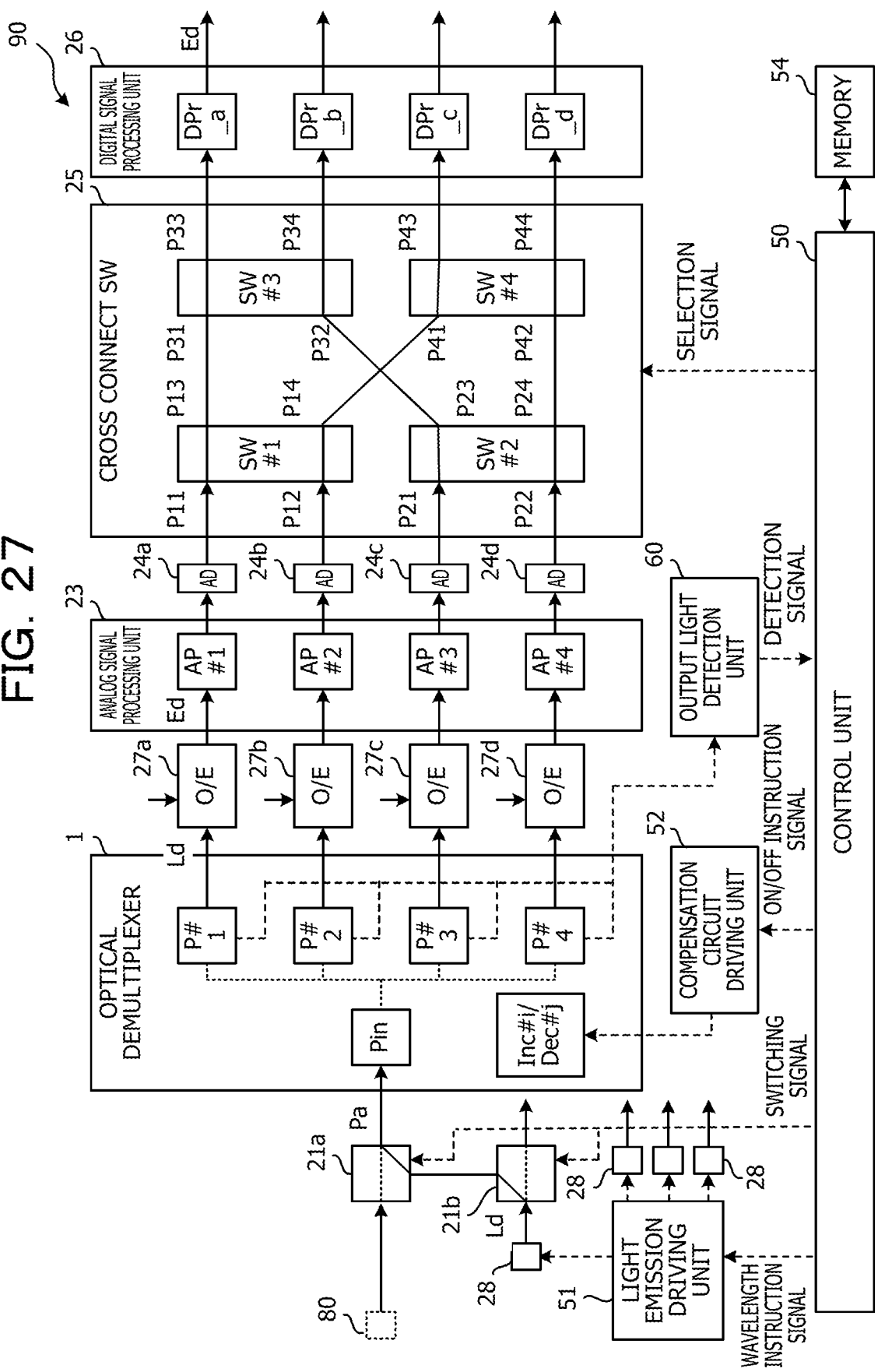
FIG. 27 is a diagram illustrating another example of a state where a wavelength light with a center wavelength being selected is input to the optical demultiplexer.

For example, as illustrated in FIG. 26, the control unit 50 makes one of the plurality of wavelength variable light sources 28 output the wavelength light La to the optical demultiplexer 1. The wavelength light La is input from the optical demultiplexer 1 to the O/E 27d. Similarly, the control unit 50 makes one of the plurality of wavelength variable light sources 28 switch each of the wavelength lights Lb to Ld one by one and output the wavelength lights Lb to Ld to the optical demultiplexer 1 so that each of the wavelength lights Lb to Ld is input from the optical demultiplexer 1 to each one of the O/E 27a to 27c. For example, as illustrated in FIG. 27, when the control unit 50 makes one of the plurality of wavelength variable light sources 28 output the wavelength light Ld to the optical demultiplexer 1, the wavelength light Ld is input from the optical demultiplexer 1 to the O/E 27a. The output ports P #1 to P #4 notify the output light detection unit 60 of whether or not the wavelength lights La to Ld are input.

Figure 28:
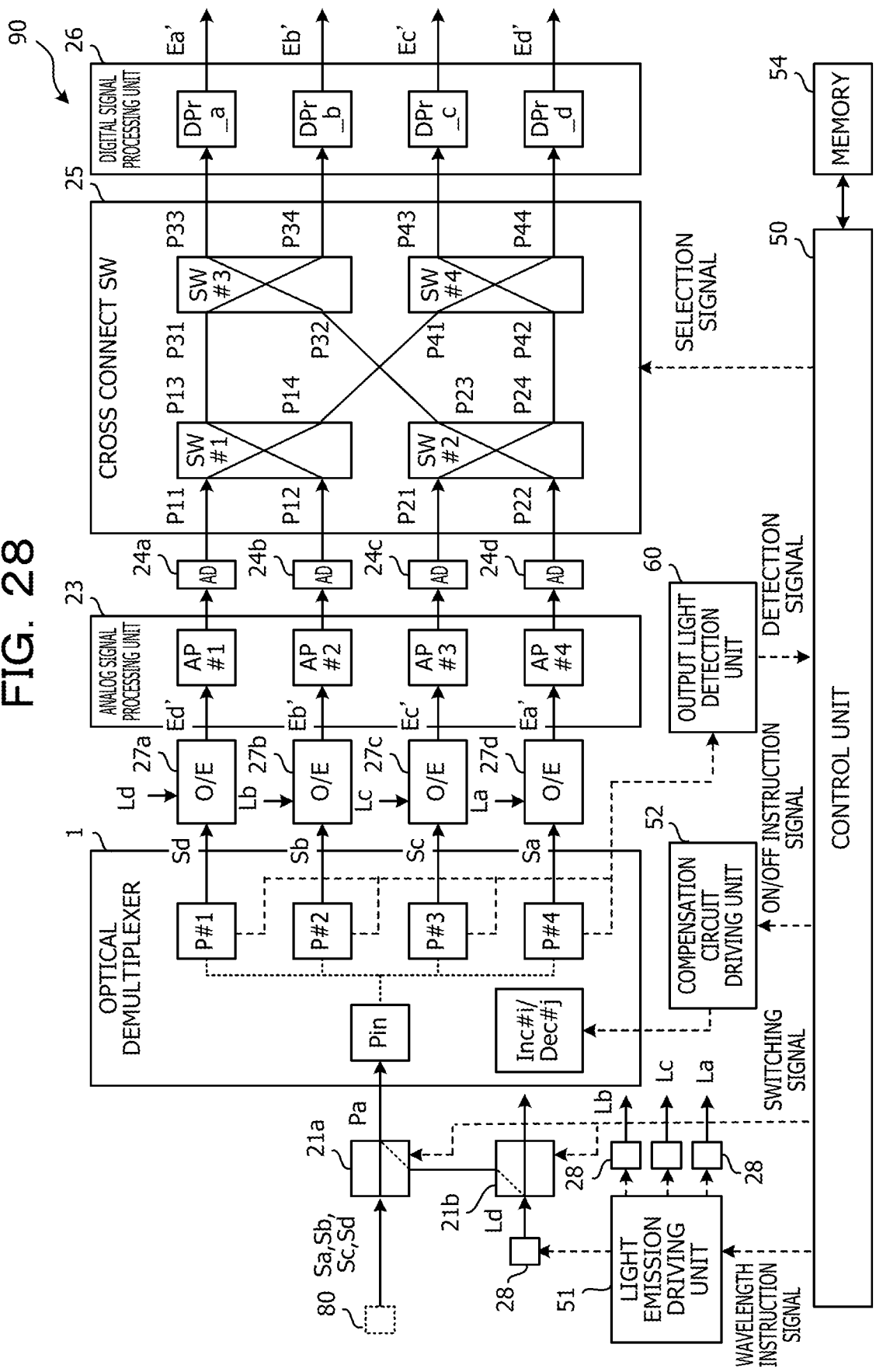
FIG. 28 is a diagram illustrating an example of a state where a wavelength multiplexing signal light is input to the optical demultiplexer.

As illustrated in FIG. 28, the 90-degree optical hybrid circuit of the O/E 27a detects the signal light Sd as a demultiplexed light using the wavelength light Ld as local emission light, and the 90-degree optical hybrid circuit of the O/E 27b detects the signal light Sb as a demultiplexed light using the wavelength light Lb as local emission light. As illustrated in FIG. 28, the 90-degree optical hybrid circuit of the O/E 27c detects the signal light Sc as a demultiplexed light using the wavelength light Lc as local emission light, and the 90-degree optical hybrid circuit of the O/E 27d detects the signal light Sa as a demultiplexed light using the wavelength light La as local emission light. The plurality of 90-degree optical hybrid circuits is an example of a plurality of detecting units. Each of the signal lights Sa to Sd as the demultiplexed light is input from the 90-degree optical hybrid circuit to the BPD.

As illustrated in FIG. 28, the BPD of the O/E 27a converts the signal light Sd into an electrical signal Ed', and the BPD of the O/E 27b converts the signal light Sb into an electrical signal Eb'. As illustrated in FIG. 28, the BPD of the O/E 27c converts the signal light Sc into an electrical signal Ec', and the BPD of the O/E 27d converts the signal light Sa into an electrical signal Ea'. The BPD is an example of a plurality of conversion units. The electrical signals Ea' to Ed' are input from the BPDs to the analog signal processing unit 23.

The analog signal processing unit 23 includes analog circuits AP #1 to AP #4 that respectively execute analog signal processing on the electrical signals Ea' to Ed'. The electrical signal Ed' is input to the analog circuit AP #1, and the electrical signal Eb' is input to the analog circuit AP #2. The electrical signal Ec' is input to the analog circuit AP #3, and the electrical signal Ea' is input to the analog circuit AP #4. The electrical signals Ea' to Ed' are input from the analog signal processing unit 23 to the ADs 24a to 24d.

The ADs 24a to 24d respectively convert the electrical signals Ed', Eb', Ec', and Ea' from analog signals into digital signals. The electrical signals Ed', Eb', Ec', and Ea' are input from the ADs 24a to 24d to the cross connect switch 25.

The cross connect switch 25 is an example of a third switch unit and selects an output destination of each of the electrical signals Ea' to Ed' from among a plurality of output destinations. The digital signal processing unit 26 is connected to a post stage of the cross connect switch 25. The digital signal processing unit 26 includes digital circuits DPr_a and DPr_b that respectively execute digital signal processing on the electrical signals Ea' to Ed'. The cross connect switch 25 selects any one of the digital circuits DPr_a to DPr_d as the output destination of each of the electrical signals Ea' to Ed' according to a selection signal input from the control unit 50.

The switches SW #1 to SW #4 can switch connections between the input ports P11, P12, P21, P22, P31, P32, P41, and P42 and the output ports P13, P14, P23, P24, P33, P34, P43, and P44 in response to the selection signal. Therefore, the cross connect switch 25 can output the electrical signals Ed', Eb', Ec', and Ea' input from the ADs 24a to 24d to any one of the digital circuits DPr_a to DPr_d according to the selection signal.

The digital circuits DPr_a to DPr_d execute digital signal processing for compensating deterioration caused in a transmission path by each of the signal lights Sa to Sd on each of the electrical signals Ea' to Ed'. The digital circuits DPr_a to DPr_d execute the digital signal processing depending on the center wavelengths λa to λd. Therefore, the digital circuit DPr_a is a circuit dedicated to the electrical signal Ea' converted from the signal light Sa. The digital circuit DPr_b is a circuit dedicated to the electrical signal Eb' converted from the signal light Sb. The digital circuit DPr_c is a circuit dedicated to the electrical signal Ec' converted from the signal light Sc. The digital circuit DPr_d is a circuit dedicated to the electrical signal Ed' converted from the signal light Sd.

The output light detection unit 60 is an example of a third detection unit and detects wavelengths λa to λd of the wavelength lights La to Ld as the demultiplexed lights respectively output from the output ports P #1 to P #4. The control unit 50 controls the cross connect switch 25 so that the signal lights Sa to Sd with the wavelengths λa to λd detected by the output light detection unit 60 are output to the output destination according to the signal lights Sa to Sd that are conversion sources of the electrical signals Ea' to Ed' of the digital circuits DPr_a to DPr_d.

For example, the output light detection unit 60 detects the wavelengths λa to λd of the wavelength lights Ld, Lb, Lc, and La on the basis of the notifications from the output ports P #1 to P #4. The output light detection unit 60 transmits a detection signal indicating the output ports P #1 to P #4 that are notification sources of the inputs of the wavelength lights Ld, Lb, Lc, and La, to the control unit 50.

The control unit 50 registers a correspondence relationship between the wavelengths λa to λd of the wavelength lights La to Ld being output, the output ports P #1 to P #4 according to the detection signal, the input ports P11, P12, P21, and P22 that are connection destinations of the output ports P #1 to P #4 and the output ports P33, P34, P43, and P44 of the cross connect switch 25, and one channel of the plurality of wavelength variable light sources 28 in a setting table of the cross connect switch 25 in the memory 54 as illustrated in FIG. 29.

After compensating the difference between the optical phases of the AMZs 1a to 1i, the control unit 50 sets each of the switches SW #1 to SW #4 in the cross connect switch 25 according to the setting table. For example, the control unit 50 sets connections between the input ports P11, P12, P21, P22, P31, P32, P41, and P42 and the output ports P13, P14, P23, P24, P33, P34, P43, and P44 of the switches SW #1 to SW #4.

For example, as illustrated in FIG. 28, the control unit 50 connects the input port P11 and the output port P14 of the switch SW #1 and connects the input port P41 and the output port P44 of the switch SW #4 so that the electrical signal Ed' that is input from the output port P #1 of the optical demultiplexer 1 to the input port P11 of the switch SW #1 is output to the digital circuit DPr_d. Furthermore, the control unit 50 connects the input port P22 and the output port P23 of the switch SW #2 and connects the input port P32 and the output port P33 of the switch SW #3 so that the electrical signal Ea' input from the output port P #4 of the optical demultiplexer 1 to the input port P22 of the switch SW #2 is output to the digital circuit DPr_a.

Furthermore, the control unit 50 connects the input port P12 and the output port P13 of the switch SW #1 and connects the input port P31 and the output port P34 of the switch SW #3 so that the electrical signal Eb' input from the output port P #2 of the optical demultiplexer 1 to the input port P12 of the switch SW #1 is output to the digital circuit DPr_b. Furthermore, the control unit 50 connects the input port P21 and the output port P24 of the switch SW #2 and connects the input port P42 and the output port P43 of the switch SW #4 so that the electrical signal Ec' input from the output port P #3 of the optical demultiplexer 1 to the input port P21 of the switch SW #2 is output to the digital circuit DPr_c.

As a result, after respectively being converted into the electrical signals Ea' to Ed', the signal lights Sa to Sd are input to the appropriate digital circuits DPr_a to DPr_d according to the center wavelengths λa to λd via the cross connect switch 25. Therefore, the optical demultiplexing device 90 can execute appropriate signal processing for each of the center wavelengths λa to λd

[Operation of Control Unit]

Figure 30:
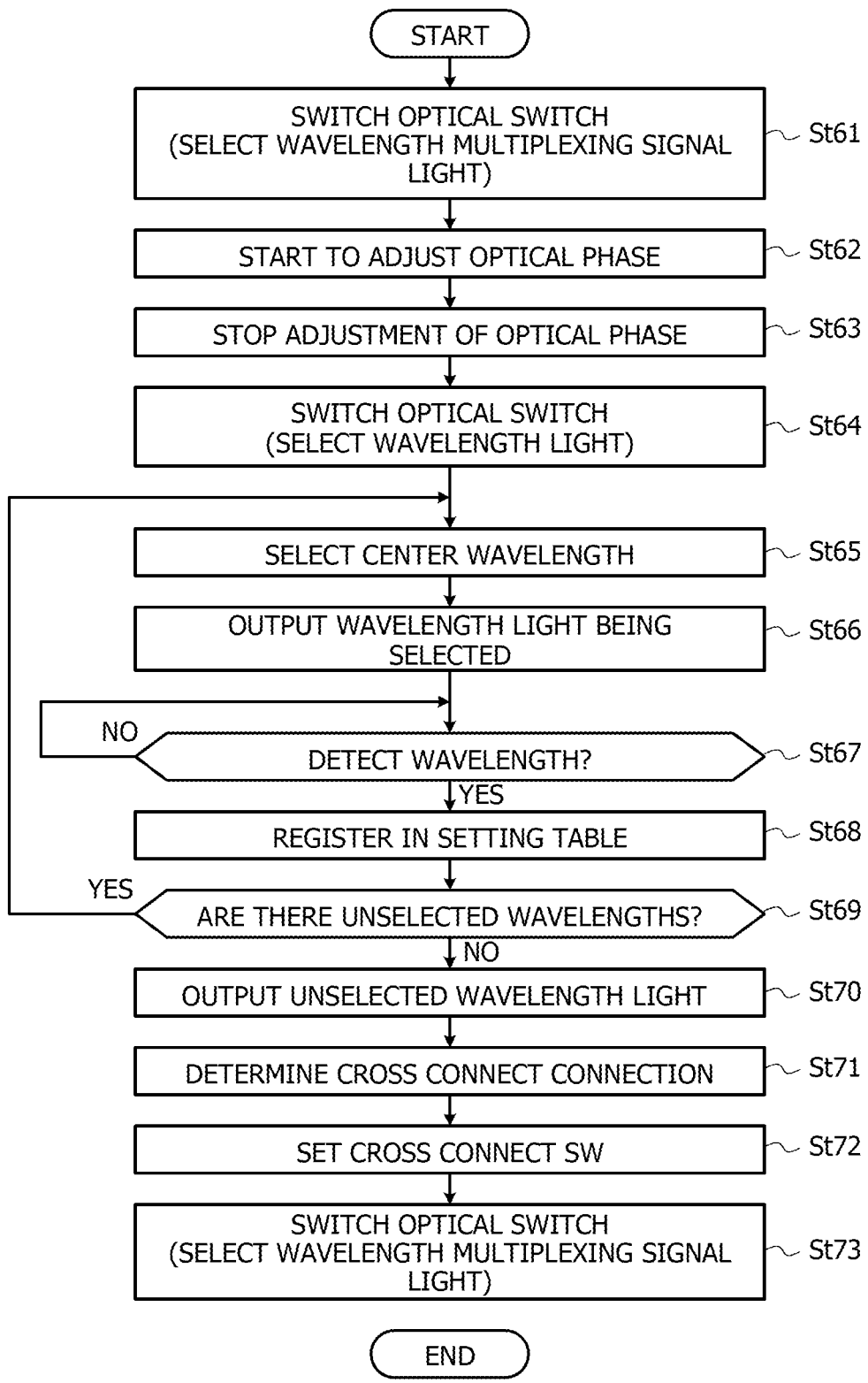
FIG. 30 is a flowchart illustrating an example of an operation of a control unit.

FIG. 30 is a flowchart illustrating an example of an operation of the control unit 50. The control unit 50 performs this operation each time when setting of the cross connect switch 25 is performed.

First, the control unit 50 switches the first optical switch 21a and the second optical switch 21b so that a wavelength multiplexing signal light is input to the optical demultiplexer 1 (operation St61). As a result, the first optical switch 21a selects an input port connected to the transmitting device 80 as an input source (refer to FIG. 25). The second optical switch 21b selects an output port connected to the O/E 27a as an output destination (refer to FIG. 25).

Next, the control unit 50 makes the compensation circuits Inc #1 to Inc #3 and Dec #1 to Dec #6 start to control phase shifters Hu and Hd so that the phase shifters Hu and Hd of each of the AMZs 1a to 1i start to adjust the optical phase (operation St62). As a result, the wavelength multiplexing signal light output from the transmitting device 80 is input to the optical demultiplexer 1, and a difference between optical phases of the respective signal lights Sa to Sd is compensated.

After the compensation of the difference between the optical phases, the control unit 50 makes the compensation circuits Inc #1 to Inc #3 and Dec #1 to Dec #6 stop the control of the phase shifters Hu and Hd so that the phase shifters Hu and Hd of the AMZs 1a to 1i stop the adjustment of the optical phase (operation St63). As a result, it is possible to suppress noise when the wavelength lights La to Ld to be output as output light from the output ports P #1 to P #4 later are detected.

After the operation in operation St63, the control unit 50 switches the first optical switch 21a and the second optical switch 21b so that the wavelength lights La to Ld are input to the optical demultiplexer 1 (operation St64). As a result, the first optical switch 21a selects an input port connected to the second optical switch 21b as an input source (refer to FIG. 26). The second optical switch 21b selects an output port connected to the first optical switch 21a as an output destination (refer to FIG. 26).

Next, the control unit 50 selects one center wavelength λa from among the center wavelengths λa to λd of the wavelength lights La to Ld (operation St65). Next, the control unit 50 controls the light emission driving unit 51 so that only the wavelength light La with the center wavelength λa being selected is output from one of the plurality of wavelength variable light sources 28 (operation St66). As a result, only the wavelength light La with the center wavelength λa being selected is input to the optical demultiplexer 1, and the wavelength light La as a demultiplexed light is output from any one of the output ports P #1 to P #4. In the present embodiment, the wavelength light La is output from the output port P #4 (refer to FIG. 26).

Next, the control unit 50 determines whether or not the wavelength λa of the wavelength light La is detected by the output light detection unit 60 (operation St67). The control unit 50 determines whether or not the wavelength λa is detected by receiving the detection signal from the output light detection unit 60. In a case where the wavelength λa is not detected (No in operation St67), the processing in operation St67 is executed again.

Furthermore, in a case where the wavelength λa is detected (Yes in operation St67), the control unit 50 registers a correspondence relationship between the center wavelength λa of the wavelength light La being output, the output port P #4 according to the detection signal, the input port P22 that is a connection destination of the output port P #4 and the output port P44 of the cross connect switch 25, and one channel #1 of the plurality of wavelength variable light sources 28 in the setting table of the cross connect switch 25 in the memory 54 (operation St68).

Next, the control unit 50 determines whether or not there are unselected center wavelengths λa to λd (operation St69). In a case where there are unselected center wavelengths λa to λd (Yes in operation St69), the control unit 50 selects the next center wavelength λb (operation St65) and executes the operation in and subsequent to operation St66 again. By repeating operations St65 to St69, the registration of the center wavelengths λa to λd in the setting table is completed (refer to FIG. 29).

Figure 31:
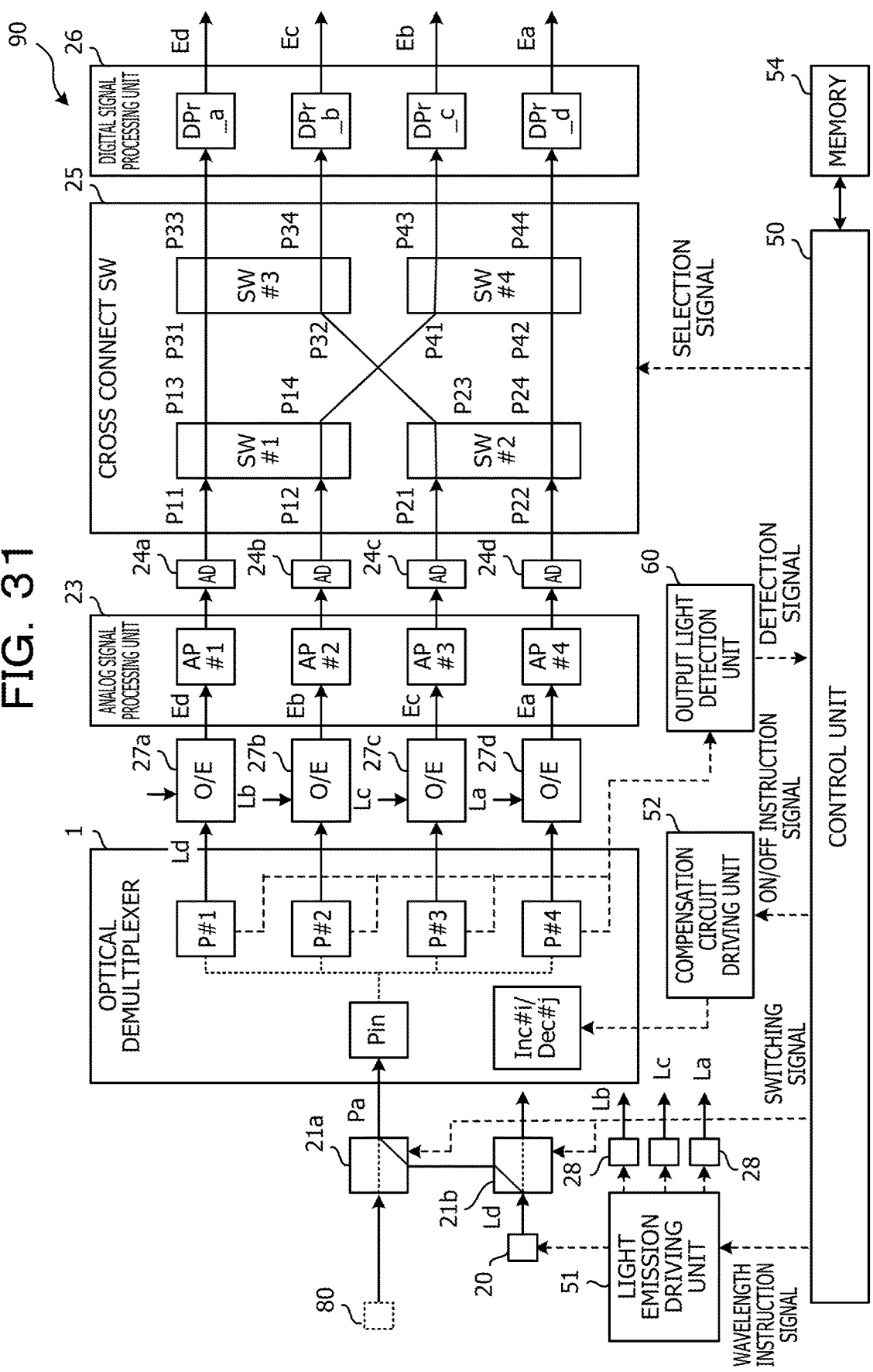
FIG. 31 is a diagram illustrating an example of a state where the wavelength light with the center wavelength being selected is input to the optical demultiplexer and a wavelength light with a center wavelength that is not selected is input to an optical-electrical converter.

Next, the control unit 50 controls the light emission driving unit 51 so that the unselected wavelength lights La to Lc with the center wavelengths λa to λc that are not selected are output from the plurality of remaining wavelength variable light sources 28 on the basis of a setting registration table (operation St70). As a result, as illustrated in FIG. 31, in a state where the wavelength light Ld with the center wavelength λd is input to the O/E 27*a* via the first optical switch 21*a* and the second optical switch 21*b*, the wavelength light La with the center wavelength λa is input to the O/E 27*d*. Similarly, the wavelength light Lb with the center wavelength λb is input to the O/E 27*b*, and the wavelength light La with the center wavelength λc is input to the O/E 27*c*.

Next, the control unit 50 determines cross connect connection of the cross connect switch 25 on the basis of the setting table (operation St71) and sets the cross connect connection to the cross connect switch 25 according to a selection signal indicating the connection relationship (operation St72). For example, the control unit 50 performs connection setting between the input port P22 and the output port P33 of the electrical signal Ea on the switches SW #2 and SW #3 so that the electrical signal Ea' is output from the output port P33 of the cross connect switch 25 (refer to FIG. 28). Furthermore, the control unit 50 performs connection setting between the input port P11 and the output port P44 of the electrical signal Ed on the switches SW #1 and SW #4 so that the electrical signal Ed' is output from the output port P44 of the cross connect switch 25 (refer to FIG. 28).

As a result, the electrical signals Ea' to Ed' are respectively input to the digital circuits DPr_a to DPr_d according to the center wavelengths λa to λd of the wavelength lights La to Ld.

Next, the control unit 50 switches the first optical switch 21*a* so that the wavelength multiplexing signal light including the signal lights Sa to Sd is input to the optical demultiplexer 1 and switches the second optical switch 21*b* so that the wavelength light La is directly input to the O/E 27*a* (operation St73). For example, the control unit 50 switches the input source of the first optical switch 21*a* from the second optical switch 21*b* to the transmitting device 80. Furthermore, the control unit 50 switches the output destination of the second optical switch 21*b* from the first optical switch 21*a* to the O/E 27*a*.

As a result, when the wavelength multiplexing signal light is input to the optical demultiplexer 1, the wavelength multiplexing signal light is demultiplexed by the optical demultiplexer 1, and the signal lights Sa to Sd as demultiplexed lights are input to the O/Es 27*d* to 27*a*. Furthermore, the wavelength lights La to Ld are input to the O/Es 27*d* to 27*a* as local emission light. The 90-degree optical hybrid circuits of the O/Es 27*d* to 27*a* detect the signal lights Sa to Sd on the basis of each local emission light and output the electrical signals Ea' to Ed'. The electrical signals Ea' to Ed' are input to a cross connect switch 27 via the BPDs of the O/Es 27*d* to 27*a*, the analog signal processing unit 23, and the A/Ds 24*d* to 24*a*. Then, by performing setting in operation St72, the electrical signals Ea' to Ed' are respectively input to the digital circuits DPr_a to DPr_d according to the center wavelengths λa to λd, digital signal processing is executed on the electrical signals Ea' to Ed', and the electrical signals Ea' to Ed' are output (refer to FIG. 28). In this way, the optical demultiplexing device 90 can execute appropriate signal processing for each of the center wavelengths λa to λd.

Note that, in each embodiment, as the configurations of the optical demultiplexers 1, 1*r*, and is, as illustrated in FIG. 1, an example has been exemplified in which the each of the pre-stage demultiplexing circuit 11 and the post-stage demultiplexing circuits 12 and 13 includes three AMZs 1*a* to 1*i* multi-stage connected in a tree-like shape. However, it is sufficient that wavelength lights La to Ld be demultiplexed by the plurality of AMZs and output from the output ports P #1 to P #4 different from each other, and the configurations of the optical demultiplexers 1, 1*r*, and is are not limited to the example described above.

The embodiments described above are preferred examples of the present disclosure. However, the embodiments are not limited thereto, and a variety of modifications may be made without departing from the gist of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The following supplementary note is disclosed.

An optical demultiplexing device comprising:
  a plurality of light sources each configured to output one of a plurality of wavelength lights of which a wavelength spacing is constant;
  a demultiplexer configured to demultiplex input light for each wavelength;
  a selector configured to select the input light from the one of the plurality of wavelength lights and a wavelength multiplexing signal light of a plurality of signal lights that includes a wavelength respectively common to the plurality of wavelength lights;
  a plurality of first detectors each configured to detect a plurality of demultiplexed lights demultiplexed by the demultiplexer according to the plurality of wavelength lights respectively output from the plurality of light sources;

a plurality of converters each configured to convert the plurality of demultiplexed lights detected by the plurality of first detectors into a plurality of electrical signals;

a switch configured to select an output destination of each of the plurality of electrical signals from among a plurality of output destinations;

a second detector configured to detect a wavelength of the plurality of demultiplexed lights; and a controller configured to control the selector, the plurality of light sources, and the switch, wherein the demultiplexer includes a plurality of asymmetric Mach-Zehnder interferometers each of which lengths of a pair of arms are different from each other, the plurality of asymmetric Mach-Zehnder interferometers are coupled to each other so that the plurality of demultiplexed lights are respectively output to the first detectors different from each other, of the plurality of first detectors, and the controller controls the selector so that the input light is switched from the wavelength multiplexing signal light to one of the plurality of wavelength lights, controls one of the plurality of light sources so that the plurality of wavelength lights is sequentially input to the demultiplexer one by one, controls the switch based on the wavelength detected by the second detector so that each of the plurality of electrical signals is output to an output destination according to the wavelength of the demultiplexed light of a conversion source of the plurality of electrical signals, of the plurality of output destinations, and controls wavelengths of the plurality of wavelength lights that the plurality of light sources respectively outputs so that the plurality of demultiplexed lights are detected according to a wavelength light of each wavelength, of the plurality of wavelength lights, based on the wavelength detected by the second detector.

What is claimed is:

1. An optical demultiplexing device comprising:
a light source configured to output a plurality of wavelength lights of which a wavelength spacing is constant;
a demultiplexer configured to demultiplex the plurality of wavelength lights;
a plurality of converters configured to respectively convert the plurality of wavelength lights into a plurality of electrical signals;
a detector configured to detect the plurality of electrical signals respectively output from the plurality of converters;
a first switch configured to select an output destination of each of the plurality of electrical signals from among a plurality of output destinations; and
a controller configured to control the light source and the first switch, wherein
the demultiplexer includes a plurality of asymmetric Mach-Zehnder interferometers each of which lengths of a pair of arms are different from each other,
the plurality of asymmetric Mach-Zehnder interferometers are coupled to each other so that the plurality of wavelength lights input from the light source is demultiplexed and respectively output to the converters different from each other, of the plurality of converters, and
the controller:

controls the light source so that the plurality of wavelength lights is sequentially input to the demultiplexer one by one, and controls the first switch so that the electrical signal detected by the detector, among the plurality of electrical signals, is output to an output destination of the plurality of output destinations according to a wavelength light of the plurality of wavelength lights of a conversion source of the electrical signal.

2. The optical demultiplexing device according to claim 1, wherein the detector detects the plurality of electrical signals input from the plurality of converters to the first switch.

3. The optical demultiplexing device according to claim 1, wherein the pair of arms of the plurality of asymmetric Mach-Zehnder interferometers include phase shifters that adjust respective optical phases in the pair of arms.

4. The optical demultiplexing device according to claim 3, wherein the controller:

controls the light source so that the plurality of wavelength lights are input to the demultiplexer, makes a phase shifter of each of the plurality of asymmetric Mach-Zehnder interferometers adjust an optical phase when the plurality of wavelength lights are input to the demultiplexer, and makes the phase shifter stop an adjustment of the optical phase when the plurality of wavelength lights is sequentially input to the demultiplexer one by one.

5. The optical demultiplexing device according to claim 1, further comprising:

an optical switch configured to select a light input to the demultiplexer from among the plurality of wavelength lights and a wavelength multiplexing signal light that includes a plurality of signal lights of which respective center wavelengths match the plurality of wavelength lights, wherein wherein the controller:

controls the optical switch so that the plurality of wavelength lights are input from the optical switch to the demultiplexer so as to control the first switch, and controls the optical switch so that the wavelength multiplexing signal light are input from the optical switch to the demultiplexer after a control of the first switch ends.

6. An optical demultiplexing device comprising:
a light source configured to output a plurality of wavelength lights of which a wavelength spacing is constant;
a demultiplexer configured to demultiplex the plurality of wavelength lights;
a plurality of optical modulators configured to optically modulate each of the plurality of wavelength lights demultiplexed by the demultiplexer, based on a plurality of data signals;
a detector configured to detect the plurality of wavelength lights respectively input to the plurality of optical modulators;
a switch configured to select an input source of each of the plurality of data signals to the plurality of optical modulators from among a plurality of input sources; and
a controller configured to control the light source and the switch, wherein
the demultiplexer includes a plurality of asymmetric Mach-Zehnder interferometers each of which lengths of a pair of arms are different from each other,
the plurality of asymmetric Mach-Zehnder interferometers is coupled to each other so that the plurality of wavelength lights input from the light source is demultiplexed and respectively output to modulators different from each other of the plurality of modulators, and the controller controls the light source so that the plurality of wavelength lights is sequentially input to the demultiplexer one by one and controls the switch so that a data signal is input from an input source according to a wavelength light of the plurality of wavelength lights of the plurality of input sources to the optical modulator to which the wavelength light detected by the detector is input.

7. The optical demultiplexing device according to claim 6, wherein the pair of arms of the plurality of asymmetric Mach-Zehnder interferometers include phase shifters that adjust respective optical phases in the pair of arms.

8. The optical demultiplexing device according to claim 7, wherein the controller:

controls the light source so that the plurality of wavelength lights are input to the demultiplexer, makes a phase shifter of each of the plurality of asymmetric Mach-Zehnder interferometers adjust an optical phase when the plurality of wavelength lights are input to the demultiplexer, and makes the phase shifter stop an adjustment of the optical phase when the plurality of wavelength lights is sequentially input to the demultiplexer one by one.

9. A transmission device comprising:

a light source configured to output a plurality of wavelength lights of which a wavelength spacing is constant;

a first and second demultiplexers each configured to demultiplex the plurality of wavelength lights;

an optical switch configured to select an output destination of the plurality of wavelength lights from the first demultiplexer or the second demultiplexer;

a plurality of converters configured to respectively convert the plurality of wavelength lights demultiplexed by the first demultiplexer into a plurality of electrical signals;

a first detector configured to detect the plurality of electrical signals respectively output from the plurality of converters;

a first switch configured to select an output destination of each of the plurality of electrical signals from among a plurality of output destinations;

a plurality of optical modulators configured to respectively optically modulate the plurality of wavelength lights demultiplexed by the second demultiplexer, based on a plurality of data signals;

a second detector configured to detect a wavelength light input to each of the plurality of optical modulators, of the plurality of wavelength lights;

a second switch configured to select an input source of each of the plurality of data signals to the plurality of optical modulators from among a plurality of input sources; and a controller configured to control the light source, the optical switch, the first switch, and the second switch, wherein the first demultiplexer includes a plurality of first asymmetric Mach-Zehnder interferometers each of which lengths of a pair of arms are different from each other, the second demultiplexer includes a plurality of second asymmetric Mach-Zehnder interferometers each of which lengths of a pair of arms are different from each other, the plurality of first asymmetric Mach-Zehnder interferometers are coupled to each other so that the plurality of wavelength lights input from the light source are demultiplexed and are respectively output to the converters different from each other, of the plurality of converters, the plurality of second asymmetric Mach-Zehnder interferometers are coupled to each other so that the plurality of wavelength lights input from the light source are demultiplexed and are respectively output to the modulators different from each other, of the plurality of modulators, the controller includes a first control mode in which the first switch is controlled and a second control mode in which the second switch is controlled, in the first control mode, controls the optical switch so that the plurality of wavelength lights is input to the first demultiplexer, controls the light source so that the plurality of wavelength lights is sequentially input to the first demultiplexer one by one, controls the first switch so that an electrical signal detected by the first detector is output to an output destination according to a wavelength light of a conversion source of the electrical signal, of the plurality of output destinations, in the second control mode, controls the optical switch so that the plurality of wavelength lights is input to the second demultiplexer, controls the light source so that the plurality of wavelength lights is sequentially input to the second demultiplexer one by one, and controls the second switch so that the data signal is input from the input source according to a wavelength light of the plurality of input sources to the modulator to which the wavelength light detected by the second detector, of the plurality of wavelength lights, is input.

10. The optical demultiplexing device according to claim 9, wherein the first detector detects the plurality of electrical signals input from the plurality of converters to the first switch.

11. The optical demultiplexing device according to claim 9, wherein the pair of arms of the plurality of first and second asymmetric Mach-Zehnder interferometers include phase shifters that adjust respective optical phases in the pair of arms.

12. The transmission device according to claim 11 wherein the controller, in the first control mode, controls the light source so that the plurality of wavelength lights is input to the first demultiplexer, when the plurality of wavelength lights is input to the first demultiplexer, makes the phase shifter of each of the plurality of first asymmetric Mach-Zehnder interferometers adjust the optical phase, and when the plurality of wavelength lights are sequentially input to the first demultiplexer one by one, makes the phase shifter of each of the plurality of first asymmetric Mach-Zehnder interferometers stop an adjustment of the optical phase.

13. The transmission device according to claim 11, wherein the controller, in the second control mode, controls the light source so that the plurality of wavelength lights is input to the second demultiplexer, when the plurality of wavelength lights are input to the second demultiplexer, makes the phase shifter of each of the plurality of second asymmetric Mach-Zehnder interferometers adjust the optical phase, and when the plurality of wavelength lights is sequentially input to the second demultiplexer one by one, makes the phase shifter of each of the plurality of second asymmetric Mach-Zehnder interferometers stop an adjustment of the optical phase.

* * * * *